United States Patent
Kedma et al.

(10) Patent No.: US 7,260,845 B2
(45) Date of Patent: Aug. 21, 2007

(54) SENSOR FOR DETECTING AND ELIMINATING INTER-PROCESS MEMORY BREACHES IN MULTITASKING OPERATING SYSTEMS

(76) Inventors: Gabriel Kedma, 15 Haruv Street, Omer (IL) 84965; Doron Havazelet, 40 Erez Street, Omer (IL) 84965

( * ) Notice: Subject to any disclaimer, the term of this patent is extended or adjusted under 35 U.S.C. 154(b) by 558 days.

(21) Appl. No.: 10/041,429

(22) Filed: Jan. 8, 2002

(65) Prior Publication Data

US 2002/0099954 A1 Jul. 25, 2002

Related U.S. Application Data

(60) Provisional application No. 60/260,203, filed on Jan. 9, 2001.

(51) Int. Cl.
*G06F 12/14* (2006.01)
*G06F 7/04* (2006.01)
*H04L 9/00* (2006.01)

(52) U.S. Cl. .......................... 726/23; 726/26; 713/166
(58) Field of Classification Search ........ 713/200–205; 395/185–186
See application file for complete search history.

(56) References Cited

U.S. PATENT DOCUMENTS 5,634,114 A * 5/1997 Shipley ...................... 717/170

(Continued)

FOREIGN PATENT DOCUMENTS

WO WO9309498 * 5/1993
WO WO9704394 * 2/1997

OTHER PUBLICATIONS

Baratloo, Tsai and Singh, Dec. 25, 1999, Libsafe Protecting Critical Elements of Stacks, Bell Labs Lucent Technologies, White Paper.*
Cowan, Pu, Maier, Walpole, Bakke, SteveBeattie, Grier, Wagle and Qian Zhang, StackGuard: Automatic Adaptive Detection and Prevention of Buffer-Overflow Attacks, Jan. 29, 1998, USENIX, 7th Security Symposium proceedings☐☐.*

(Continued)

*Primary Examiner*—Ayaz Sheikh
*Assistant Examiner*—Aravind K Moorthy
(74) *Attorney, Agent, or Firm*—Martin Fleit; Paul D. Bianco; Fleit Kain Gibbons Gutman Bongini & Bianco P.L.

(57) ABSTRACT

The invention relates to a method for detecting and eliminating SCR breach operations by a second party within the memory space allocated to a first party, in a multi-tasking system, which comprises: (a) pre-recording by the first party within a knowledge base the structure and/or behavior of an SCR stack; (b) implanting within the SCR stack a dedicated SCR for reporting on the structure and/or behavior of said SCR stack when the SCR stack is activated; (c) when the SCR stack is activated, comparing the data reported by the dedicated SCR with the pre-recorded stack structure and/or behavior; (d) whenever non-matching in the structure and/or behavior is found, ceasing the activity of the activated stack, and alerting.

13 Claims, 13 Drawing Sheets

U.S. PATENT DOCUMENTS

| | | | |
|---|---|---|---|
| 5,805,880 A * | 9/1998 | Pearce et al. | 713/2 |
| 5,819,091 A * | 10/1998 | Arendt et al. | 719/331 |
| 5,949,973 A * | 9/1999 | Yarom | 713/200 |
| 5,970,245 A * | 10/1999 | Poteat et al. | 717/128 |
| 5,974,549 A * | 10/1999 | Golan | 713/200 |
| 6,141,698 A * | 10/2000 | Krishnan et al. | 719/331 |
| 6,243,692 B1 * | 6/2001 | Floyd et al. | 705/59 |
| 6,275,938 B1 * | 8/2001 | Bond et al. | 726/23 |
| 6,301,699 B1 * | 10/2001 | Hollander et al. | 717/131 |
| 6,405,316 B1 * | 6/2002 | Krishnan et al. | 713/190 |
| 6,578,094 B1 * | 6/2003 | Moudgill | 710/57 |
| 6,578,146 B2 * | 6/2003 | Johnson | 713/189 |
| 6,728,964 B1 * | 4/2004 | Butt | 719/313 |
| 6,832,302 B1 * | 12/2004 | Fetzer et al. | 711/170 |
| 2002/0083334 A1 * | 6/2002 | Rogers et al. | 713/200 |
| 2005/0246522 A1 * | 11/2005 | Samuelsson et al. | 713/150 |
| 2006/0075260 A1 * | 4/2006 | Tucker et al. | 713/190 |
| 2006/0085857 A1 * | 4/2006 | Omote et al. | 726/24 |
| 2006/0242704 A1 * | 10/2006 | Aviani et al. | 726/23 |

OTHER PUBLICATIONS

Mohay et al, Kernel and Shell Based Applications Integrity Assurance, 1997, IEEE, pp. 34-43.*

Levine et al, Detecting and Categorizing Kernel-Level Rootkits to Aid Future Detection, 2006, IEEE, pp. 24-32.*

* cited by examiner

SENSOR FOR DETECTING AND ELIMINATING INTER-PROCESS MEMORY BREACHES IN MULTITASKING OPERATING SYSTEMS

CROSS-REFERENCE TO RELATED APPLICATION

This application claims the benefit of U.S. Provisional Application No. 60/260,203, filed Jan. 9, 2001, the disclosure of which is incorporated herein by reference.

FIELD OF THE INVENTION

The present invention relates to the field of protecting and securing data in computerized systems. More particularly, the invention provides a method and system for detecting inter-process memory breaches in multitasking operating systems.

BACKGROUND OF THE INVENTION

Modern operating systems are actually a modular collection of building blocks rather than one monolithic object. This form of architecture enables an Operation System (OS) manufacturer to build and distribute new facilities (or new versions for existing facilities) with relative ease. It also enables third party programmers to add new capabilities to a basic operating system without accessing its source code, by means of well-defined extension interfaces.

In particular, the Input/Output (I/O) architecture of a conventional operating system is multi-layered, scaleable and extensible, i.e., each packet of I/O data travels along a chain of layers, wherein the layers are organized so that applications that are being executed by the OS at the system of a user are divided into separate functional components that interact in some sequential and hierarchical way, with each layer in the chain usually having an interface only to the layer above it and the layer below it. Some of the layers are those provided with the original software package of the OS, some are updates, others are additional layers not present in the original software package, and finally, some are actually built by third party suppliers (including original parts of the original software package that were subcontracted).

Operating systems usually make a distinction between a privileged mode and non-privileged mode regarding the ability of a process to call 'privileged' services. The notion of multi-layered architecture and underlying extension mechanisms apply to both modes, but the implementation may differ significantly.

A Privileged mode (so-called "Kernel-mode") is the essential core of any OS, which provides basic services for other parts of the OS. Typically, the Kernel-mode is the part of the OS that resides in the memory of the computer at all times during its operation, and provides basic services. It is the part of the OS which is closest to the machine level and may directly activate the hardware of such a computerized system, or interface with another software layer which drives a hardware. Due to performance considerations, kernel-mode processes typically share the system's physical memory space without an extra mapping of their non-privileged mode relatives. A kernel-mode process can be seen as a server to many non-privileged mode processes, which is vulnerable to possible low-level breaches. A process of a non-privileged mode (so-called "user-mode") can call system services that are not privileged.

In particular, user-mode multi-layer extension mechanisms are quite vulnerable to memory-space breaches. These enabling mechanisms are relatively well documented, and a dedicated programmer having access to the interfaces of these extension mechanisms is generally able to implement them in quite a short time. Some well known books in the field of general Operating Systems, particularly Windows™ OS provide relevant information regarding this subject.

From now on, and unless otherwise stated, the following text will refer to user-mode.

The building blocks of standard applications, such as a word processor, an Internet browser etc., are code modules, usually divided into program modules and/or into Shared Code Resources (SCRs). Examples for such SCRs are the Dynamic Link Library (DLL), which are included in the Windows OS of Microsoft. Furthermore, each application may use several SCRs on the same session. Generally, SCRs are grouped in stacks, wherein each stack contains several SCRs, sometimes a dozen or more SCRs are grouped together in one stack. The SCRs are organized in each stack in a chain-like manner. Normally, whenever a service from a specific SCR is requested by a user application, the request travels along the whole relevant stack, however, the user application has no clue about the specific SCRs that actually serve it along the way.

Moreover, when an extension is needed to one of the OS services, for example, encrypting certain I/O data packets, an insertion of an SCR into the relevant stack chain should do. Of course that SCR has to comply with a given interface and be good mannered, the least it should do is to dispatch incoming calls to the next SCR in the chain.

In a typical case, an extender, which might be, for example, a specific process, requests from the OS to insert an SCR into a specific extensible chain. If all goes well, the SCR is inserted as a new "layer", and starts receiving relevant calls as if it was an original part of the stack, and of the OS. From this point on, until this new SCR is appropriately removed from the chain, the newly installed SCR is mapped into the address space of any application that happen to use that relevant stack.

Due to resource-economy considerations, a reasonable multitasking operating system would load just a single copy of a given SCR into the physical memory, and then map it to the virtual address space of each process that might need it. More particularly, each 'instance' of the SCR is mapped to the appropriate process context. Unfortunately, there is more than one way to share memory between the SCR's 'instances'.

Combining the aforementioned factors that compromise the requirement for separation between memory spaces of different processes, there is an opportunity for offenders to abuse the inherent mechanisms of the operating system. In fact, this provides a possible way for one process to break into the memory space of another process.

An offender that has managed to break into the memory space of another process has a choice of options. Amongst other threats, the offender may read or manipulate I/O, it might change the behavior of the invaded application, or it may send information from one process to another process.

One of the most serious aspects of memory-space breaches is the ability of the offender to take the identity of the invaded process. This makes life harder for auditing tools and intrusion-detection systems, and makes the search for accountability more difficult.

In general, memory-space breaching seems as an appropriate technique for an invader, whose goal is not mere vandalizing of an invaded site. Sophisticated contamination of the victim's valued information resources would be a possible goal. Altering the behavior of unaware information-security systems through their user-mode components is another goal, so is eavesdropping or stealing information, to mention just a few.

For example, a ubiquitous OS like MS Windows™ (Microsoft Corporation, USA) gives a program the ability to order the OS to extend, on the fly, SCR stacks, wherein each SCR provides a particular level of functionality. In many cases this goes on without alerting the user of this OS. The extension is done by adding at least one SCR to the chain, wherein this SCR may serve more than one application or process concurrently.

There are several mechanisms in the OS that might be extended by additional SCRs. The following are examples for some well known in the art of such mechanisms:

(i) windows-messages that may be hooked;
(ii) video and audio Compressor/De-Compressor (codecs);
(iii) Windows Open Services Architecture (WOSA) stacks, which is a collective term for a variety of programming interfaces from Microsoft designed to provide application interoperability across the Windows environment. An example for WOSA is the Windows Socket (Winsock), which is a Windows interface to a communications protocol over the Internet; and
(iv) There are more WOSA mechanisms like ODBC and MAPI. Furthermore, there is the infrastructure for the 'Component Services' of Windows. This list is by no means a complete list of all the vulnerable service chains in a modern OS, but only a list of examples.

The art has not yet provided satisfactory protection means for detecting and/or preventing such inter-process memory breaches in multitasking OS.

It is an object of the present invention to improve the security in multi-users and multitasking systems.

It is another object of the present invention to provide a method and system for detecting an illegal action of penetrating a memory space of one process by another process.

It is further object of the present invention to provide a method and system for detecting a process that initiates such penetrating action.

It is a still further object of the present invention to provide a method and system for freezing the action of the invader and/or the invaded processes, and alerting on such illegal action.

Other objects and advantages of the invention will become apparent as the description proceeds.

SUMMARY OF THE INVENTION

The invention relates to a method for detecting and eliminating SCR breach operations by a second party within the memory space allocated to a first party, in a multi-tasking system, which comprises: (a) pre-recording by the first party within a knowledge base the structure and/or behavior of an SCR stack; (b) implanting within the SCR stack a dedicated SCR for reporting on the structure and/or behavior of said SCR stack when the SCR stack is activated; (c) when the SCR stack is activated, comparing the data reported by the dedicated SCR with the pre-recorded stack structure and/or behavior; (d) whenever non-matching in the structure and/or behavior is found, ceasing the activity of the activated stack, and alerting.

Preferably the comparison of structure comprises verification of one or more of the following: the number of SCRs within the stack; the chain order of the SCRs within the stack; the time-stamps of the SCRs within the stack; the names of the SCRs within the stack; a signature of each SCR within the stack; the number of bits of each SCR within the stack; a checksum of each SCR within the stack; the physical path and name of each SCR within the stack.

Preferably the comparison of behavior comprises verification of one or more of the following: duration of performance of the stack, and/or each SCR within the stack; the I/O devices and/or addresses to which a communication is made when the stack is activated by a specific process.

According to one embodiment of the invention the SCR breach operation is carried out by means of implanting SCRs within a shared stack by the second party. According to another embodiment of the invention the SCR breach operation is carried out by means of implanting or manipulating by the second party an SCR within a shared stack supposed to be activated by the first party, and wherein the SCR implanted or manipulated by the second party is designed to perform operations within the memory space exclusively allocated to the first party.

Detecting and eliminating SCR breach operations by a second party within the memory space allocated to a first party, in a multi-tasking system is performed, preferably, with respect to each stack supposed to be activated by the first party.

Preferably, the stack behavior is checked independent of the process that activating it and/or the stack behavior is checked specifically with respect to the process that activating it.

The invention further relates to a sensor for detecting and eliminating SCR breach operations by a second party within the memory space allocated to a first party, in a multi-tasking system, which comprises: (a) at least one probe implanted within a stack by the first party, for reporting on the structure and/or behavior of the SCR stack, when the SCR stack is activated; (b) a knowledge base for containing information relating to the structure and/or behavior of the stack, when activated; (c) a comparing unit for comparing information relating to the stack structure and/or behavior as reported by the probe, with information recorded in the database; and (d) a decision unit capable of initiating one or more of the following operations, if abnormal structure and/or behavior of the active stack is detected in step c: ceasing operation of the active stack; alerting the user of the detection of an abnormal structure and/or behavior of the active stack; analyzing the operation of the active stack to detect the second party that originated the SCR breach operation; and informing other fellow agents.

In order to increase the efficiency of the system of the invention, it comprises a plurality of sensors for detecting and eliminating SCR breach operations by a second party within the memory space allocated to a first party, in a multi-tasking system.

According to one embodiment of the invention a sensor comprises a plurality of probes implanted each within one stack.

DETAILED DESCRIPTION OF PREFERRED EMBODIMENTS

Throughout this specification, the following definitions are employed:

Handler: in the context of this application, the term handler is used herein in a free manner to denote (I) a software routine that performs a particular task on the fly or (II) a package of some routines with a common destination. Each layer comprising of at least one handler.

SCR: Shared Code Resource—in the context of this application, an SCR is an executable program module that perform some particular functions on behalf of other SCRs, independent executables, or the OS itself.

Computerized system: in the context of this application, refers to one or more machines that operate by an OS.

Task: in the context of this application, a task is the running session of a program, an application, or some other piece of code on a computerized system.

Process: action operating in a multi-tasking system which uses part of the computerized system resources. Under Windows, each process has at least one thread of execution (see below).

User-mode process: Processes that run in the so-called 'user-mode' are assigned a virtual private address space, and the OS maps between physical memory addresses and each process address space. The 'memory-space' of each user-mode process should be isolated. This requirement arises from stability considerations. For example, a faulty operation of one user process should not crash the operation of another process or the whole system. Another reason for this isolation is the need for security, as discussed above. However, as will be shown hereinafter, this isolation can be broken, resulting in a breach of security.

Thread: a thread is a mechanism that enables concurrent flow of execution within a given process. It can utilize multiprocessor machines when available, or merely harness CPU cycles. Threads are useful for tasks that require concurrent processing, for tasks that need user interaction while doing CPU-intensive activity, and for 'server' programs where new threads are launched for each incoming request, to smoothen and isolate concurrent requests from multiple client applications and, possibly, multiple users.

Name: Throughout this document, when the term "SCR name" or "module name" are used, it is referred to the name of the disk-file that holds the image of an SCR or a so-called module, including the whole sequence of global path, local name, extension, etc. This is important because a well-known technique for diverting the expected functionality of a given SCR, at least under Windows™, is to plant an SCR with the same local name of the original SCR, but at the path where the OS is likely to search first. Typically the new SCR will be placed at the same folder of the target program (which expects to use the original SCR) executable file, while the original SCR rests at a common folder where the OS keeps such SCRs.

Figure 1A:
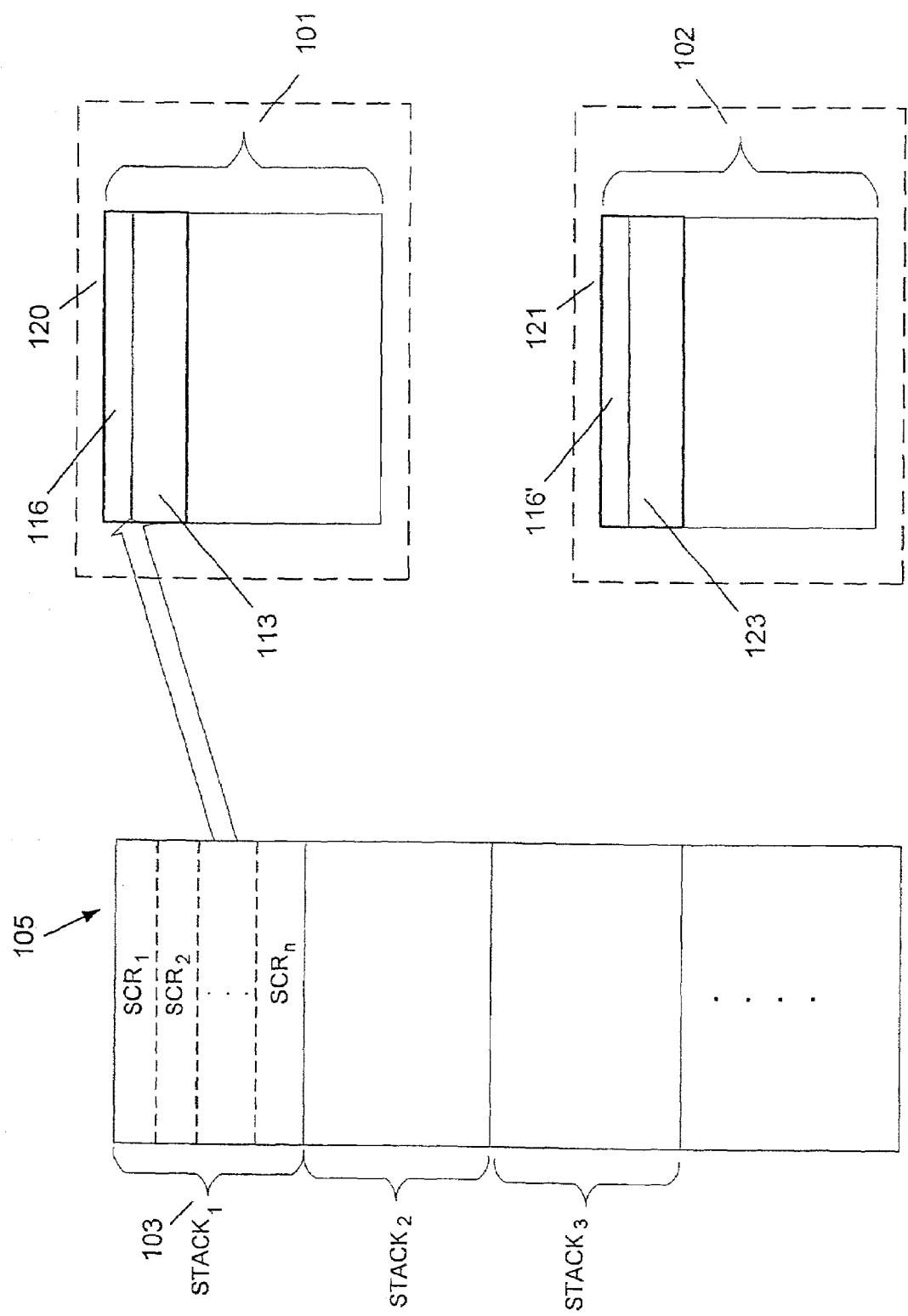
FIG. 1A illustrates the manner of activating SCRs by a conventional multi-tasking operating system.

FIG. 1A illustrates the manner of activating SCRs by a conventional multi-tasking operating system. The operating system (not indicated in this figure) contains a library 105 of user-mode SCRs. A plurality of SCR stacks are generally contained within the library 105, wherein each stack contains a plurality of SCRs organized in a chain-like form. In the case of Windows, such SCRs are DLL files. The SCR stacks are generally available to service any process in the system for carrying out specific tasks. For example, when a first process 101 activates a stack 103 of SCRs from the library 105, the operating system creates a virtual mapping of stack 103, so that the first process actually sees in its memory space 120 a copy 113 of stack 103, and activates the same. Generally, each stack contains a plurality of SCRs, and the process selectively uses only one or few SCRs from each stack, but the whole stack is activated. If a second process 102, needs a service from the same stack 103, the same procedure repeats, and a virtual mapping 123 of stack 103 is produced in the memory space 121 of the second process. More particularly, the first process sees a virtual copy 113 of the stack 103 within its memory space 120, and the second process sees a virtual copy 123 of stack 103 within its memory space 121, however, both actually operates the same stack 103. Security considerations require a total separation between the virtual memory 120 of the first process 101, and the virtual memory 121 the second process 102. However, as will be shown, this is not always the case. The fact that the same library stacks, in this example stack 103, are shared by more than one process, enables a user of a second process to breach the memory space of a first process, by altering an SCR stack that is used by said first process. This is generally done by creating an SCR, and implanting it within a stack that supposed to be used by said first process. Whenever said altered stack is activated by said first process, the implanted SCR is also activated. The implanted SCR can perform essentially any activity within the memory space of said first process. For example, if a user of the second process implants an SCR within stack 103, said SCR will appear in the memory space of any process that will use stack 103 in the future, for example as SCR 116' within the memory space 120.

Figure 1B:
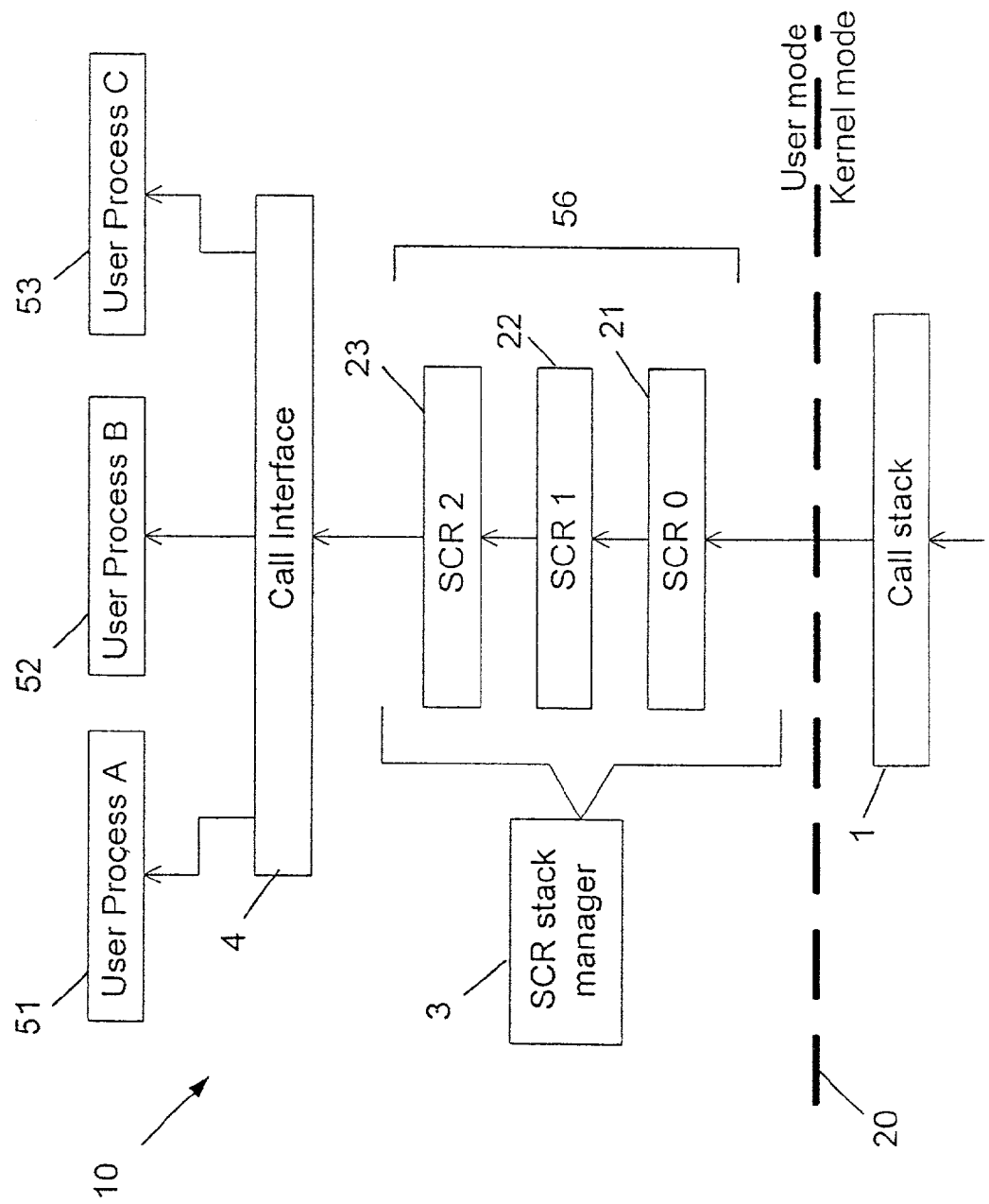
FIG. 1B schematically illustrates the architecture of the extensible chain, according to the prior art.

FIG. 1B illustrates, in block diagram form, a typical architecture of an extensible multi-layered system 10. FIG. 1B illustrates the relevant portions of system 10. Typically, system 10 makes a distinction between kernel-mode and user-mode, regarding the memory allocation. Such a distinction is indicated by dotted line 20. When any of the processes 51, 52, or 53 wishes to get a service from an SCR stack, it calls the OS (not shown), which in turn activates the stack. Each process maps the stack to its isolated memory space, however only one copy of the stack exists within the physical memory. The SCR stack manager 3 manages the operation of the stack, and the Call Interface 4 interfaces between the stack 56 and each process, for example 51, 52 or 53, that needs a stack service. Call Interface 4 implies that a specific software module (not shown) is available in the system to activate a stack and map it to each process. The Call Interface 4 is sometimes called an Application Program Interface (API).

As said, essentially all the existing operating systems allow a user to add one or more SCRs to any shared stack, for enhancing the services he receives from the stack. A person, who, unfortunately, can be a possible offender, can add a new SCR to an extensible stack, for example a Winsock stack. In that way, the added SCR within the relevant stack would be available to any process requiring the service of said stack in user-mode. After activating the stack by a specific user, or by the offender in a manner of inserting the stack into the memory space of that specific user, the added SCR can perform any task as designated by the offender. For example, if a specific application process is directed to store in memory any character typed on a keyboard, and the added SCR is programmed to read from that memory storage and transmit the content to the process of the offender, then the offender will be informed on whatever typed by the user on his keyboard.

Figure 1C:
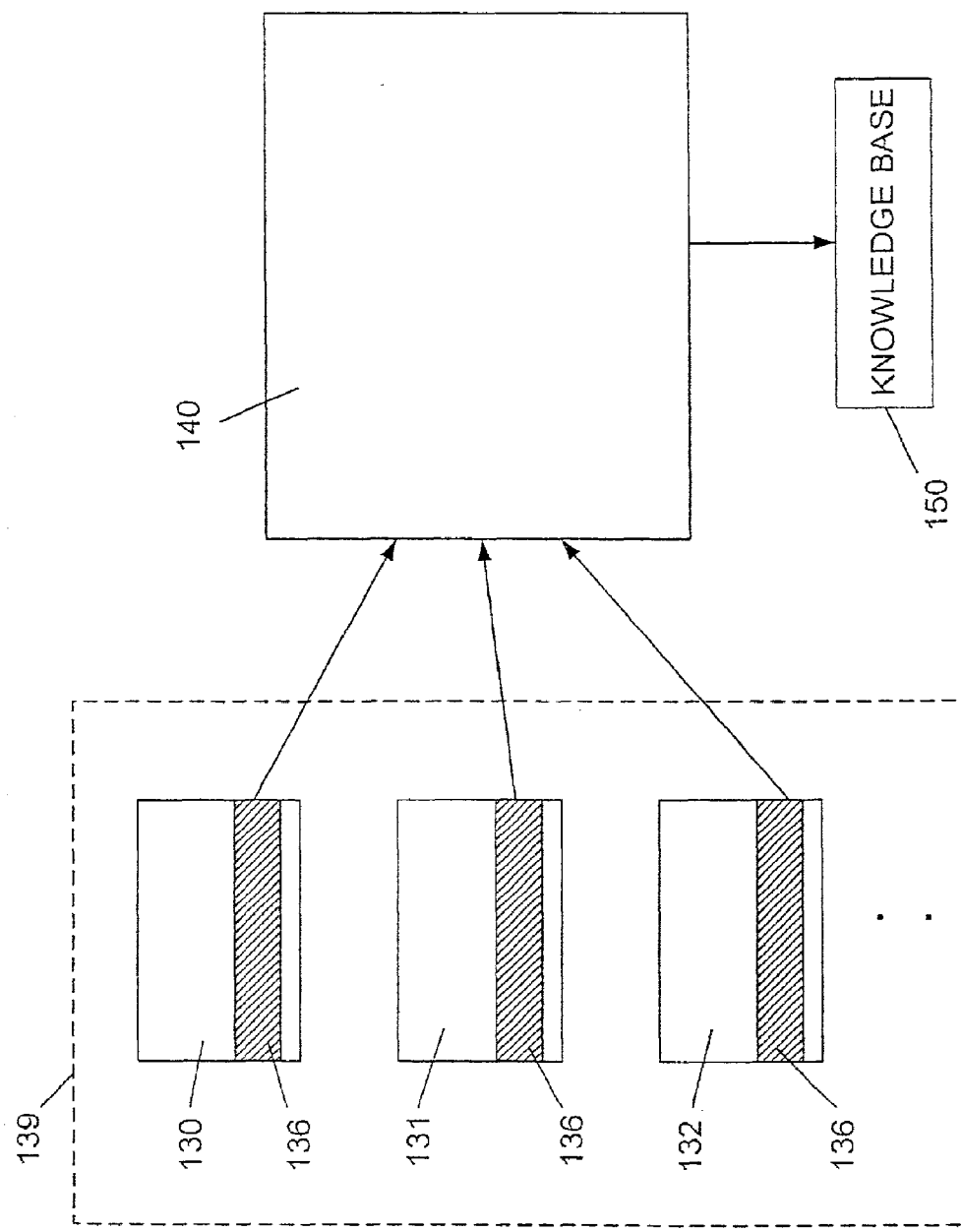
FIG. 1C illustrates how a sensor of the invention is activated to protect a plurality of SCR stacks.

According to an embodiment of the present invention, at least one sensor (or array of sensors) 140 is provided for detecting breach activities by means of illegally using SCRs, and for preventing such breach activities. FIG. 1C illustrates how such sensor activation is provided. Initially, a knowledge base 150 is prepared, which contains authentication information regarding each stack that supposed to be checked. For example, for stack 130 the knowledge base 150 contains at least the list of all the SCRs within the stack, and the last date of their updating. Within each stack 130-132 of library 139, an authenticating SCR 136 is implanted by the valid user. Authenticating SCR 136 hereinafter also referred to also as "probe". This SCR is implanted in such a manner as to be activated any time when the stack is called, so preferably it should be implanted as close as possible to the beginning of the stack chain. Then, whenever a stack is activated, for example stack 130, the authenticating SCR 136 activates the sensor 140, which is a piece of code, the purpose of which is to check the authenticity of the stacks of library 139, and to detect any unauthorized action within the stacks of it. When the stack is activated, the sensor 140 checks the authenticity of the stack operation, and its structure. The sensor 140 performs this operation by means of comparing the stack activity and its structure with the expected parameters as stored in the knowledge base 150 for the same stack. For example, whenever stack 130 is activated, sensor 140 compares the SCR found in said stack 130 with the list of SCRs expected to be included within this stack. Whenever a new SCR is found within the stack, and absolutely if such a new SCR is activated, an alert is sent, and optionally its activation is freezed or inhibited as defined, until a further decision is made. It should be noted that knowledge base 150 should preferably be dynamically updated with new information regarding the structure and authenticity of the stacks, and regarding suspected parameters or signs that should be particularly checked. In one embodiment of the invention, the sensor 140 is a "public" sensor. A public sensor is a unit, which is common to all the stacks within library 139. In another embodiment of the invention, a plurality of dedicated "private" sensors are provided, one for each stack in the library. In such a case, each authenticating SCR 136 includes the sensor 140, and the authenticating parameters (as stored in knowledge base 150) relevant to the one stack supposed to be monitored.

It is important to note that:

(i) A sensor may encounter different scenarios, depending mainly upon the behavior of the offender, whether it is an eavesdropper, a manipulator, or another;

(ii) Each scenario may comprise many states, either consequently or concurrently; and (iii) There may be multiple operation-modes of a sensor: it may be implemented as an independent service-program, it may be integrated into common OS components, or it may be a replacement of some standard input element.

The invention provides a protection against manipulation of SCRs by offenders. More particularly, the invention provides a sensor that examines the activity of the shared stacks and SCRs, and if a suspected activity within the said shared resources is detected, an alert to the legal user is provided. For example, in a first embodiment of the invention used for a first given range of services (which will referred to hereinafter as the first setting, there is provided a sensor that can detect whether an extra SCR has been added to a stack, without determining the identity of the added SCR. The aforementioned sensor is implemented as an SCR (probe) that is added to a stack chain, in a similar manner to the tainted SCRs it is supposed to detect. The sensor uses the fact that it is inserted and positioned first, when possible, within the stack chain and then, when the stack is activated, it is inserted into the address space of the user's process and thus can monitor the activity of the stack. For example, under Microsoft Windows™, the first setting is typical with window messages and message-hooks, that deal mainly with defining an application's behavior and its reaction to standard OS messages. The sensor of the invention therefore searches for unauthorized breaches within the activity of these messages.

According to another embodiment of the invention, a sensor for detecting unauthorized activities within a second range of services, referred to herein as the second setting, is provided. The sensor in that case enumerates the chain within each stack, and detects unauthorized activities in these stacks. More particularly, the sensor for the second setting enables a user to obtain a list of the SCRs within each stack chain, and the SCRs relative position within the chain. Whenever a new SCR is detected within the chain, when the stack is activated, the sensor initiates an alert. For example, under Microsoft Windows™, second setting is typical with WOSA implementations, which deal mainly with information delivery. Although an operation system, such as the Windows NT, would normally prevent a user without appropriate permission from installing a new Winsock provider, the more ubiquitous versions of Microsoft Windows (e.g., Windows 98) would not prevent it. Furthermore, even under Windows NT, when File Allocation Table (FAT) is used instead of the New Technology File System (NTFS), a common user is free to manipulate the system and cause hostile applications and modules to activate when an administrator logs in; this obviously circumvents the prior limitation.

Figure 2A:
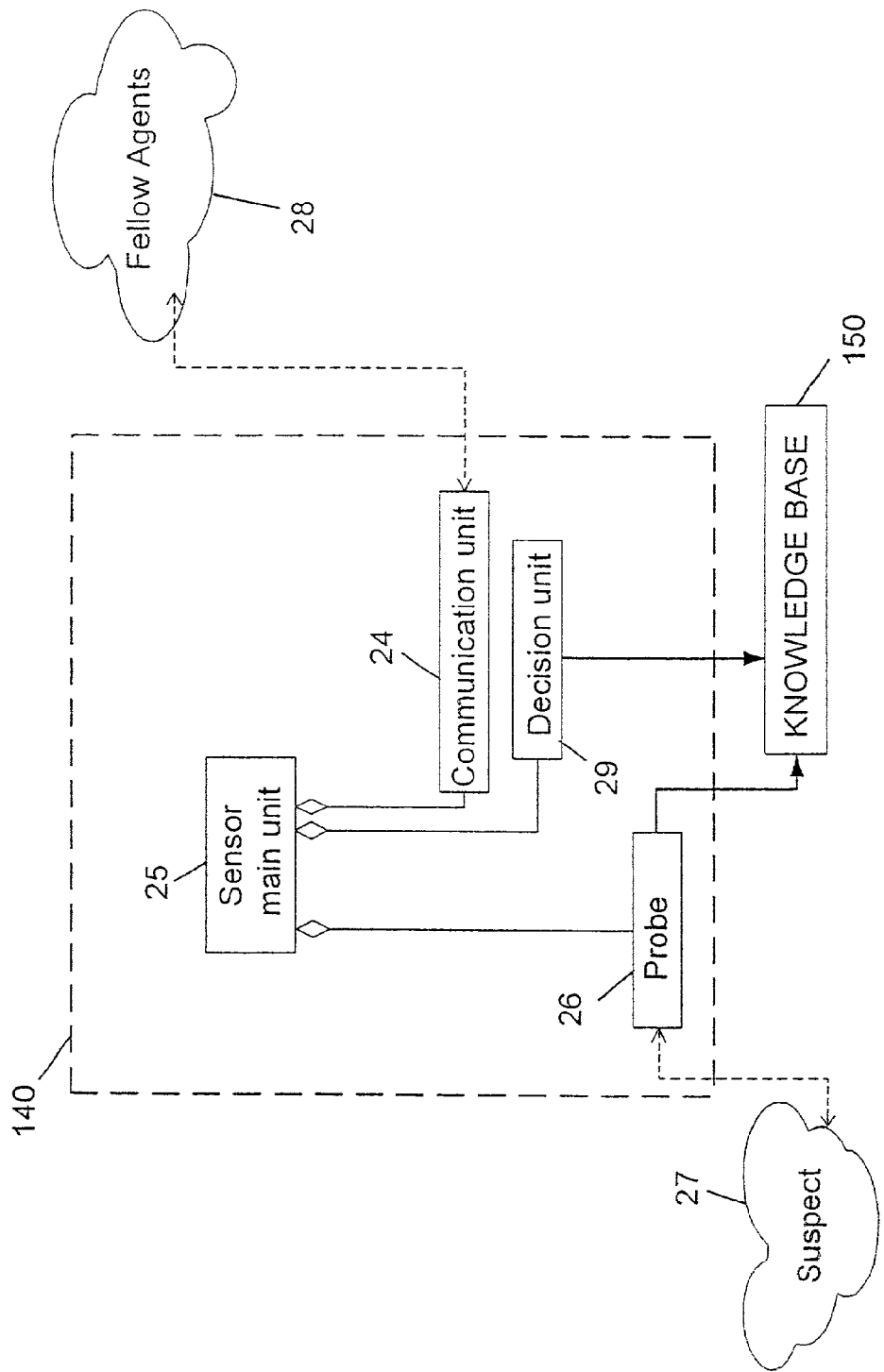
FIG. 2A schematically illustrates the main components of a sensor, according to a preferred embodiment of the present invention.

FIG. 2A schematically illustrates the overall architecture of a sensor for detecting breaches within shared resources. The sensor comprises the sensor main unit 25, a probe 26 for sampling the stack activity, wherein the probe is the SCR that is installed within the stack chain, a decision unit 29 and a communication unit 24. The sensor itself communicates and compares information with knowledge base 150, that as said includes authentication information relating to the expected structure and activity of each stack.

The overall architecture may further comprise one or more fellow agents 28 that can be used, generally, for notifying other systems about the detection of a suspected SCR, or notifying the system about suspected signs. The sensor's main unit 25 may communicate with external fellow agents 28 via the communication unit 25, for: (i) posting each state-transition, from a currently activated SCR to the next SCR in the chain, to form a log queue. (ii) Alerting the decision unit 29, or a human user when a predefined threshold condition is met, i.e., a suspected SCR is detected. (iii) Receiving instructions from the decision unit 29. (iv) Accepting new weights from an agent 28 (or the human user). (v) Receiving load/unload commands from a risk-assessor (not shown) and a load-balancing agent (not shown). This is useful for (I) eliminating false alarms, and (II) economize the usage of limited system resources. Fellow agents 28 may reside either within the same machine, or somewhere within the network.

As will be further discussed hereinafter, probe 26 has a different implementation for each setting (i.e., first or second settings), scenario or operation-mode.

The sensor's main unit 25 creates and activates probe 26 as said, which is an SCR inserted into the stack chain. After the activation of probe 26, the sensor main unit 25 enters into a waiting state in which it waits for notifications from probe 26 on suspicious SCRs, when detected. Probe 26 operate as follows:

- it waits for signals, in this context, 'signals' are indications given by the OS, concerning some state transitions. Since each sensor of the invention is responsible for checking just a limited range of state transitions, a reference is made herein to a 'range of signals' that a given sensor should handle.
- upon detecting a signal transition, probe 26 evaluates the specific signal transition in order to detect whether the transition is suspicious or not. The evaluation process is described hereinafter.
- if the signal is found to be suspicious, then the probe 26 notifies the main unit 25, which in turn performs one or more of the following procedures: it freezes the suspected signal stack, it continuous monitoring of the stack, or it initiates an alert.

Probe 26 receives updates from the main unit 25 on its desired mode of operation. The mode of operation may either be user defined, or dominated by self learned rules. It uses relatively fast heuristics to determine if a monitored signal should be treated as suspected. If the heuristics indicate a state transition, probe 26 flushes a dedicated cache of state-records, which it keeps, for a more persistent storage, available also to sensor 25 and/or to fellow agent 28. If the heuristics indicate that the current state requires intervention, probe 26 freezes the suspected SCR 27 and, possibly, the whole offended process as well, and it notifies the sensor's main unit 25.

Figure 2B:
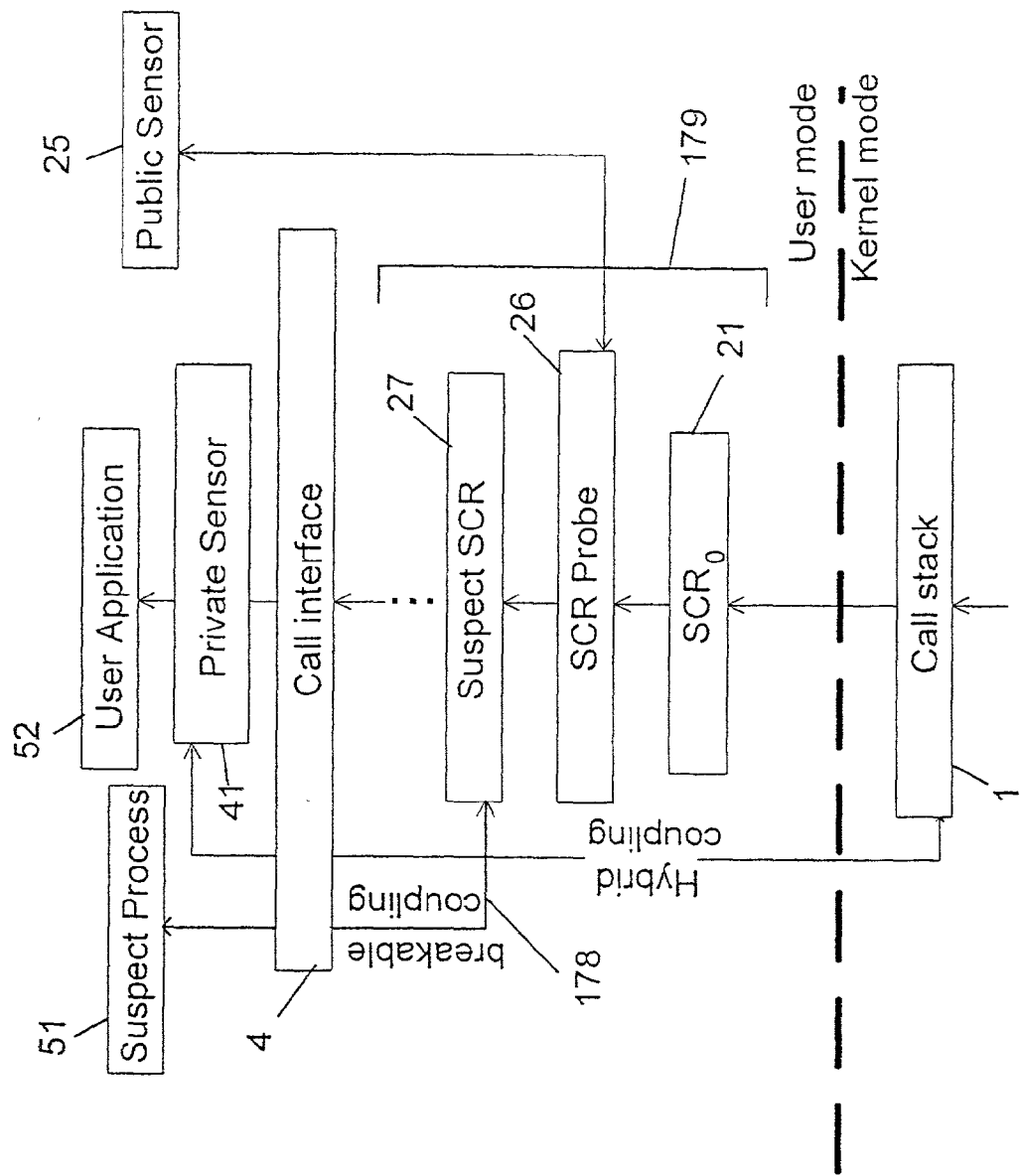
FIG. 2B schematically illustrates the placement of public sensors and private sensors, according to an embodiment of the present invention.

FIG. 2B schematically illustrates the implementation of sensors within a system 10, according to an embodiment of the invention. Block 1 indicates the calling of a stack by the kernel of the OS. Following this call, the stack is activated, including its chain 179 of SCRs. SCR 21 is a valid SCR. The SCR probe 26, which is a part of the sensor of the invention, is indicated as numeral 26. Numeral 27 indicates a tainted SCR, which is implanted by an offender. The call interface 4 interfaces between the active chain 179 and the application via sensor 41, which is capable of freezing the operation of the stack, or breaking the connection between the active chain and the application 52.

As shown, whenever the suspect SCR is successfully implanted within the chain by an offender, it, for example, is capable of transferring information to another process of the offender via connection 178. However, the private sensor 41 and the public sensor 25 are capable, according to the invention, of breaking the connection between the suspect SCR 27 and the suspect process 51. The public sensor 25 is a sensor common to a plurality of stacks and it can receive information from the SCR probe 26 in similarity to the private sensor 41. It should be noted that it is important for the SCR probe 26 to be installed as close as possible, whenever the OS enables it, to the beginning of the chain, indicated by SCR 21.

The private sensor 41 is implemented as a common component, which may be coupled with call stack 1 in the kernel-mode. More particularly, the private sensor 41 is actually a hybrid: coupling the top-level input-element with a low-level kernel-mode module (or a user-mode 'base provider' when it is guaranteed to stay lowest), using encryption/decryption to (I) detect unauthorized manipulators and (II) to provide more 'passive' security against silent eavesdroppers. Providing 'trusted' SCRs with a private/public key pair can help indicating when an infiltrator has messed with I/O, especially if those keys are 'short lived': valid for only a limited short period of time.

Note: In all the following flow diagrams, when a loop arrow such as "no signal" arrow of block 221 of FIG. 2c appears, it indicates that the procedures stays in the same block until the block receives a new input or condition, in which it again performs its related operation.

Figure 2C:
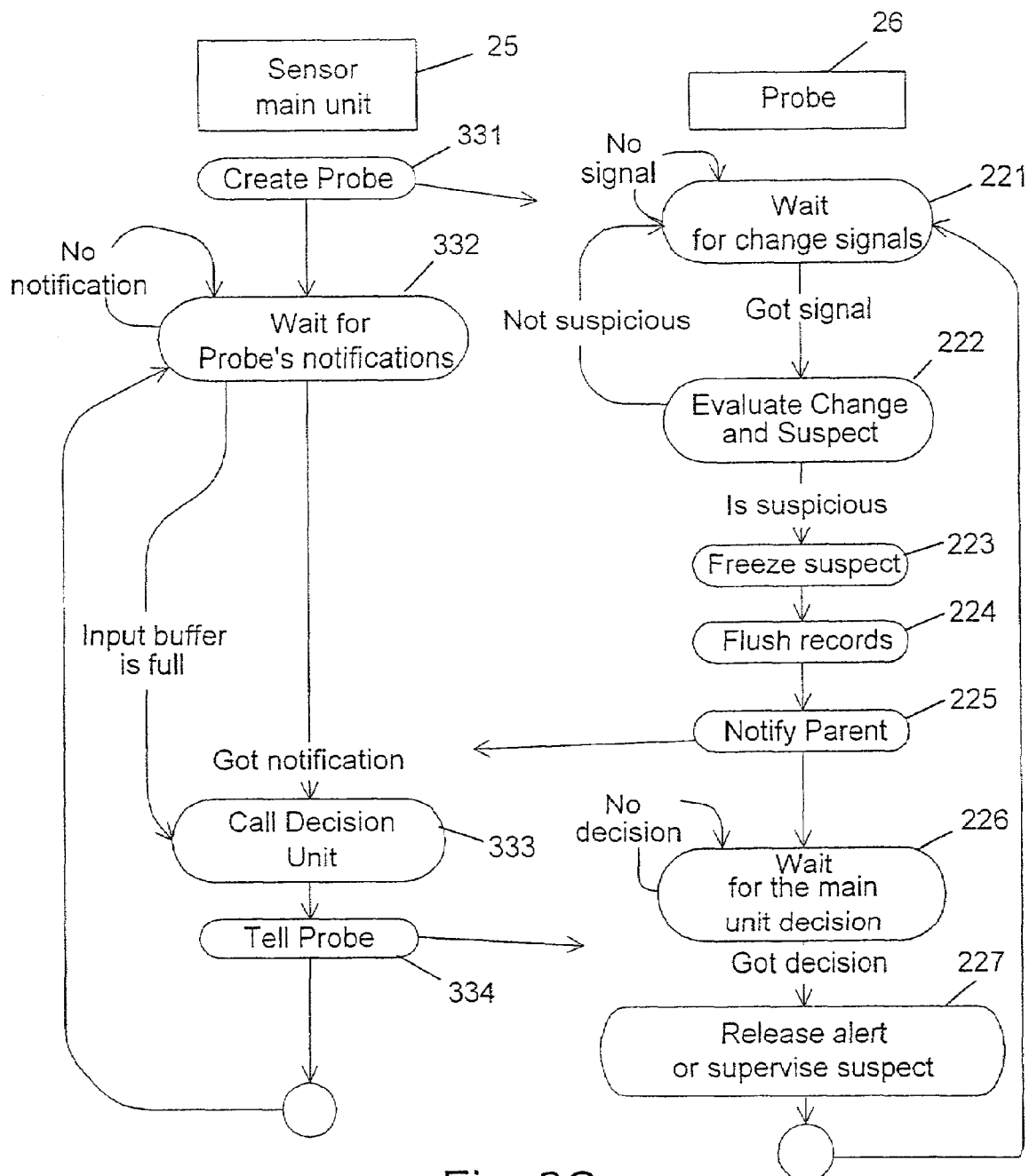
FIG. 2C illustrates the interaction between the monitoring probe and the sensor main unit according to a preferred embodiment of the present invention.

FIG. 2C illustrates the interaction between the probe 26 and the sensor main unit 25. Initially, in step 221 the sensor main unit 25 creates the probe, which is essentially an SCR, and implants it within the stack. The sensor main unit 25 then waits for a call from probe 26. It should be noted that the main unit 25 may create and control a plurality of probes, one for each stack, or a plurality of main units 25, each having one probe 26, may be formed. At this stage, when the stack is activated, the probe begins in step 222 to evaluate changes in the activated stack, and looks for the existence of a possible suspect SCR. If an abnormal condition is found in step 222, in step 223 the probe freezes the activity of the stack, including all its SCR components. In the next step, 224, the probe 26 flushes or transfers the records collected by the probe either to the main unit 25 or to a local storage maintained by the probe 26 itself. In step 225, the probe 26 calls the main unit 25. In block 333, the main unit 25 transfers the received records to the decision unit 29, for evaluation. In step 226, the probe 26 waits for a conclusion made by the decision unit 29. When such a conclusion is available, it is conveyed in step 334 to probe 26. If the conclusion shows that the stack activity is valid, the main unit 25 releases the previously freezed activity in step 227, otherwise an alert is initiated in step 227, or the stack is further supervised as suspected.

Figure 3:
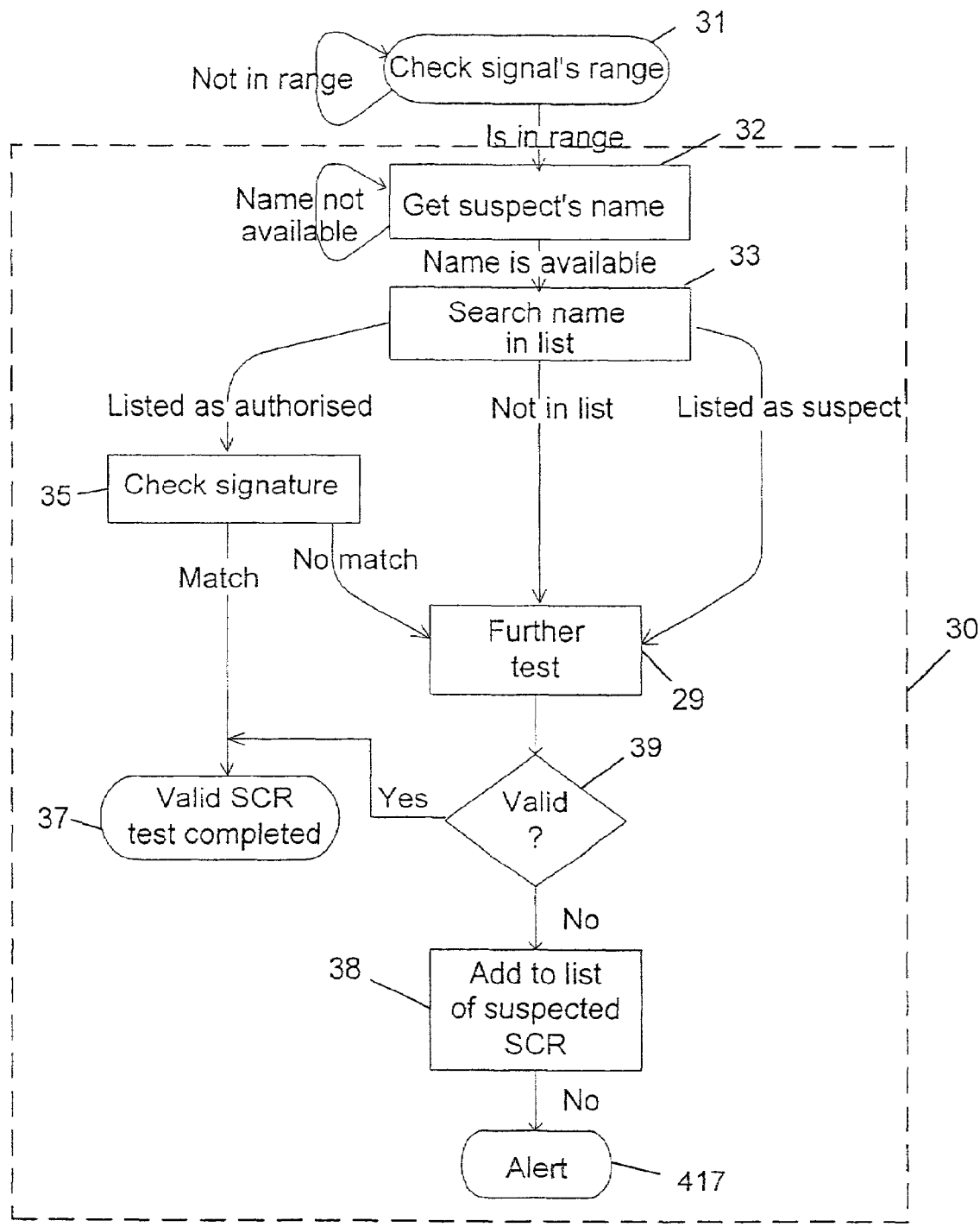
FIG. 3 is a flow diagram showing the evaluation of a suspect by its module-name.

FIG. 3 illustrates in a flow diagram form the evaluation of a signal by probe 26, according to an embodiment of the invention. As previously noted, a 'signal' in this context is an indication given by the OS about some particular state transition. Initially (not shown), a range of operation for the checking by the probe is defined. The range relates to the parameters that are checked, their value, etc. and definition is made with respect to the conditions where a further check is needed. It should be noted that not all signals are handled by each sensor; rather, each sensor has a 'range' of signals which it can handle. This range is implemented generally by a simple table or list that is saved in knowledge base 150. Next, in block 31, probe 26 checks whether a condition has been detected that justifies a further checking. If not, the procedure stays in block 31 until the occurrence of an event indicating that the checked parameters are within the pre-defined checking range. If a condition within the range of checking has been detected, the procedure continues to block 32.

If a suspected SCR is detected, the procedure obtains in block 32 its name. Whenever the name of the suspected SCR is available, a verification is made in step 33 in a list of invalid SCRs of knowledge base 150 to find whether the found SCR is listed there. Searching the said list, leads to one of the following three options:

First option: The SCR is found in the list of suspected SCRs within the knowledge base 150. In that case, the procedure continues to block 29 for a further test.

Second option: The SCR is not found in the list of invalid SCRs or in the list of valid SCRs within the knowledge base 150. In that case the procedure also continues to block 29 for a further test.

Third option: the SCR is listed in the list of valid (authorized) SCRs. In that case, a signature test is performed in step 35. If the SCR pass the signature test, it is assigned as a valid SCR in block 37. If, however, the SCR does not pass the test, the procedure continues to step 29 for a further test.

In step 29 a further test is performed until a decision is obtained. In step 39, if the test of step 29 shows that the SCR is valid, the SCR is added in step 37 to the list of authorized SCRs in knowledge base 150. If however the test shows that the SCR is unauthorized, its name (and optionally other characteristics of it) is first added in step 38 to the list of unauthorized SCRs, and an alert is initiated in step 417.

Figure 5:
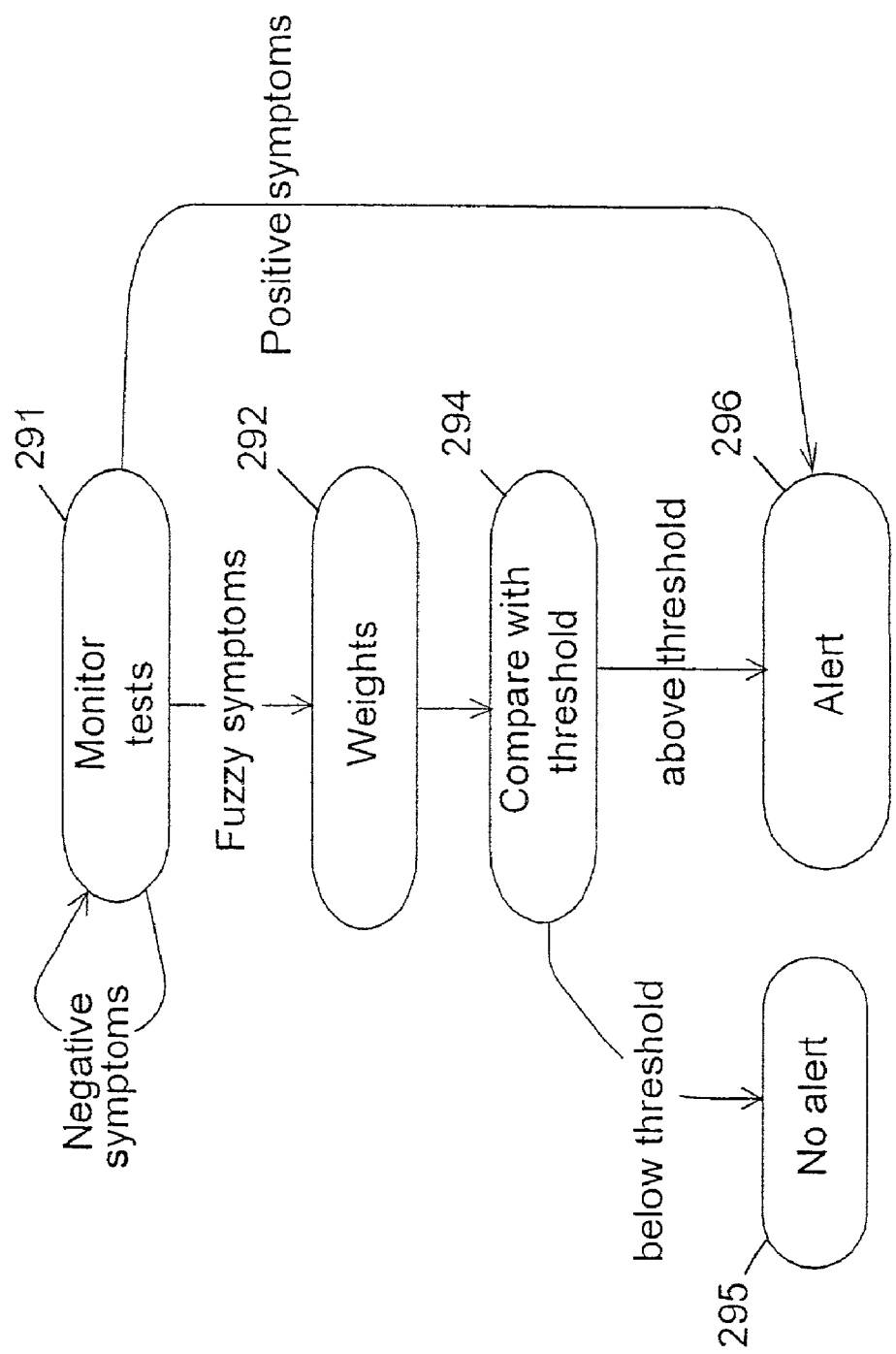
FIG. 5 is a flow diagram showing the operation of the sensor's decision unit.

FIG. 5 is a block diagram illustrating the general operation of the decision unit 29. In block 291, decision unit 29 monitors the probe 26. As long as there are no suspected symptoms, the operation of unit 29 stays in block 291. Generally, the monitoring of probe 26 can obtain one or more of the following symptoms:

Negative symptoms, i.e., unsuspected symptoms that indicate that there are no signs for offenders or offending activities.

Positive symptoms, i.e., assured symptom of suspected offender.

Fuzzy symptoms, i.e., non-decisive symptoms, which can not provide certain indication whether an offender or suspected symptoms exist.

It is important to note that upon detecting a fuzzy symptom or a positive symptom by probe 26, the sensor mechanism may freeze the action of the invader, the invaded processes or both, and alerting a human user or an intelligent software that are authorized to decide upon a further action.

Upon receiving positive symptoms from probe 26, in block 296 the decision unit, by means of the sensor main unit 25 and communication unit 24 initiates an alert and optionally also notifies fellow agents 28.

Whenever the received symptoms are fuzzy, or non-decisive, then in step 292 the sampled symptoms are received from probe 26 and are evaluated and their weight is considered in step 294, by comparing them to a pre established threshold level. Typically, the weights are initially set to equal values (1.0's); when the user confirms an alert, the weights of exitatory inputs are incremented while the weights of inhibitory inputs are decremented, and vice versa. This simple learning mechanism, however, is implemented by a separate module. Also, the user may explicitly set the weights to some reasonable values. If a comparison shows that the threshold level is not met, then in step 295 the sensor main unit 25 orders probe 26 to release the frozen process and resume the monitoring, and no alert is initiated. If, however, the threshold level is met, the procedure continues to block 296, in which the sensor main unit 25 initiates an alert, orders probe 26 to manipulate the suspect signal, and optionally transmit an alert to fellow agents 28.

When applicable, unit 25 may further maintain a 'sand box', or a 'redo buffer' (which are respectively commercial names for mechanisms that put the suspect into a secured environment, or record a suspected sequence of actions so that they may be inverse) or deceive the offender to think that it is still performing unnoticed.

In a preferred embodiment of the invention the sensor of the invention is a learning unit, that accumulates information from several sources. More particularly, its knowledge base 150 is dynamically updated as a result of the tests that are made, or from information obtained from external sources, or from the user himself.

The present invention deals with several typical OS offenders, as follows:

passive offender: eavesdrops on signals passed between the OS and another process. It plants its SCR in the extensible chain of handlers of a stack, and then simply waits for the OS to route signals to that SCR. When the SCR receives such a signal from the OS, it can push it into a shared memory area that is available for the originating process of the offender, that process would typically cache the information and send it out later through some output device or communication port.

direct approach passive offender: operates after the SCR is implanted. It directly sends out eavesdropped information, or manipulates signals before passing them on, all without involving the SCR's originating process. This behavior implies that logged output actions would go under the identity of the offended process. on the other hand, this direct approach may result in both noticeable degradation and anomalies in the performance of the offended process.

active offender: takes hold of the offended process main logic (or a 'subclass' of it). It plants its SCR in the extensible chain, and then deliberately initiates a signal that triggers the SCR into action, rather than wait for the OS to pass such a signal. When the SCR receives that signal, it would transplant a predefined wrapper on the offended process' relevant procedure, forcing a new behavior. Except for the initiating signal, this type of activity would typically go on without intervention of the initiating offender process, as with the 'direct approach' offender.

The invention provides several examples of sensors that can be implemented in some known in the art operating systems.

public sensor mechanism: a public sensor, according to the present invention, is an independent process, preferably a program that runs by itself directly under the OS, and exists for the purpose of handling periodic service requests that the system expects to receive (i.e., daemon as in the Unix OS or a service) to ensure its continuous availability. The main unit (i.e., main unit 25) of the public sensor mechanism plants its probe 26 (implemented as an SCR) into the stack chain (e.g., Winsock) in much the same way that an offender does. Public sensor mechanism is capable of protecting various stack types with minimal or no preparations on their part, however, each stack requires its specific probe. It also pushes its own identifier onto the probe's shared memory section, for a later use. The 'identifier' in this case is a unique string or number that enables the probe to distinguish the relevant public sensor from other modules. The identification is typically provided by the OS.

private sensor mechanism: a private sensor is implemented as a part of an input-element (such as an HTML input tag, which is a code that informs the web browser how to display information) that is protected. The enhanced input-element is either available to developers of compiled programs before compilation, or replaces the standard component/library in case of scripting programs and authoring environments (like an HTML input tag). In that case, the load on the system performance is minimized since protection is applied only when actually needed. Sensor 41 as shown in FIG. 2B, is an example of a private sensor.

The following is a description of a first operation mode of a public sensor for first setting with passive offender, according to an embodiment of the invention:

In the first operation mode, the sensor has to detect and evaluate whether a new code module was inserted into the context of a specific extensible process.

FIGS. 4A-4E are flow diagrams describing several optional verification tests that are performed by the sensor of the invention in order to detect illegal memory breach by means of shared codes resources.

Figure 4A:
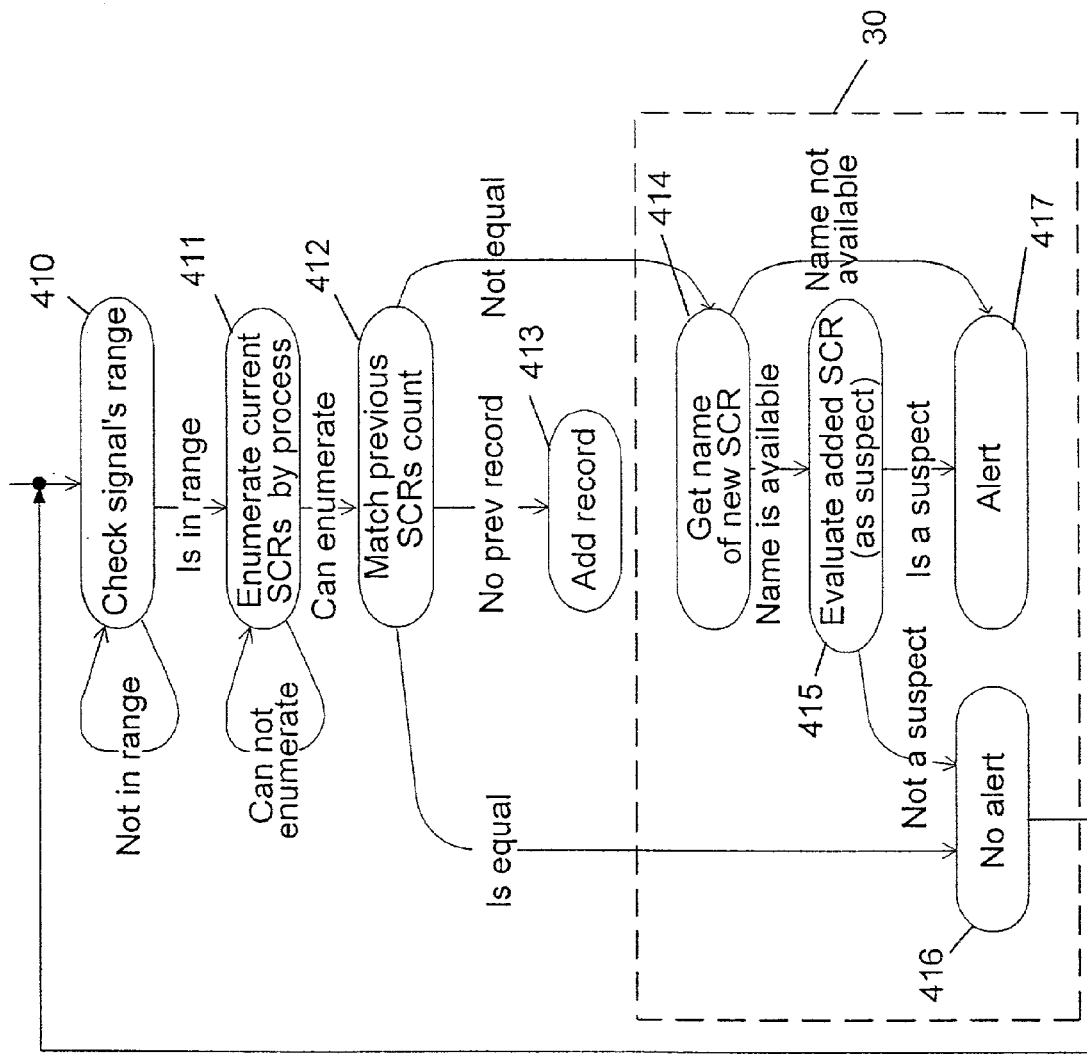
FIG. 4A is a flow diagram showing the evaluation on a process level whether an SCR is added to a process.

In the Embodiment of FIG. 4A

In some cases, the Operating System enables an on-line identification of the occurrence of adding an SCR to a process during the process operation. The embodiment of FIG. 4A, is applicable for the case when the operating system enables obtaining a list of SCRs mapped to given processes. The procedure therefore checks the available list, and if a new, suspected SCRs is found within the list, an alert is issued.

1. In step 410, the sensor checks whether enough parameters are available for carrying out the test.
2. In step 411, the procedure enumerates the SCRs mapped into the currently running process, giving both the total number of SCRs and, preferably, also their order. If the enumeration is successfully obtained, the procedure continues to step 412.
3. In step 412, the procedure compares the obtained enumeration with the previously recorded SCR enumeration of same SCR list in knowledge base 150.
4. If a match of the enumeration is found in step 412, the procedure assumes that the stack operation is legal, no alert is issued, and the operation returns to step 410, to check the next available occurrence of this type.
5. If no match is found in step 412 due to non-existence of SCR enumeration record of said stack within knowledge base 150, and if there are no other signs in knowledge base 150 of a suspected breach, it is assumed that this is not a sign for a breach, and the obtained enumeration is recorded within knowledge base 150 for a future use. In some other cases, however, this may be considered as a suspected sign, and the user is notified accordingly.
6. If the enumeration verification of step 412 shows no enumeration match, the procedure continues to step 414.
7. In step 414, the name of the SCR that has been found to be added to the stack is obtained. If, however, the name of the new SCR cannot be obtained for some reason, an alert is issued (in step 417).
8. In step 415, the SCR which has been found to be added to the process is evaluated. The evaluation may include several tests, such as, the SCR function, its structure, etc. The evaluation of this stage may use data stored in knowledge base 150, in order to characterize the added SCR. Of course, if more than one SCR is found to be added, the procedure is carried out separately for each SCR. If the evaluation shows that the SCR is suspected, an alert is issued in step 417. Otherwise, the procedure continues to step 416, which does not issue an alert, and continues in supervising the shared code activity in step 410.

Figure 4B:
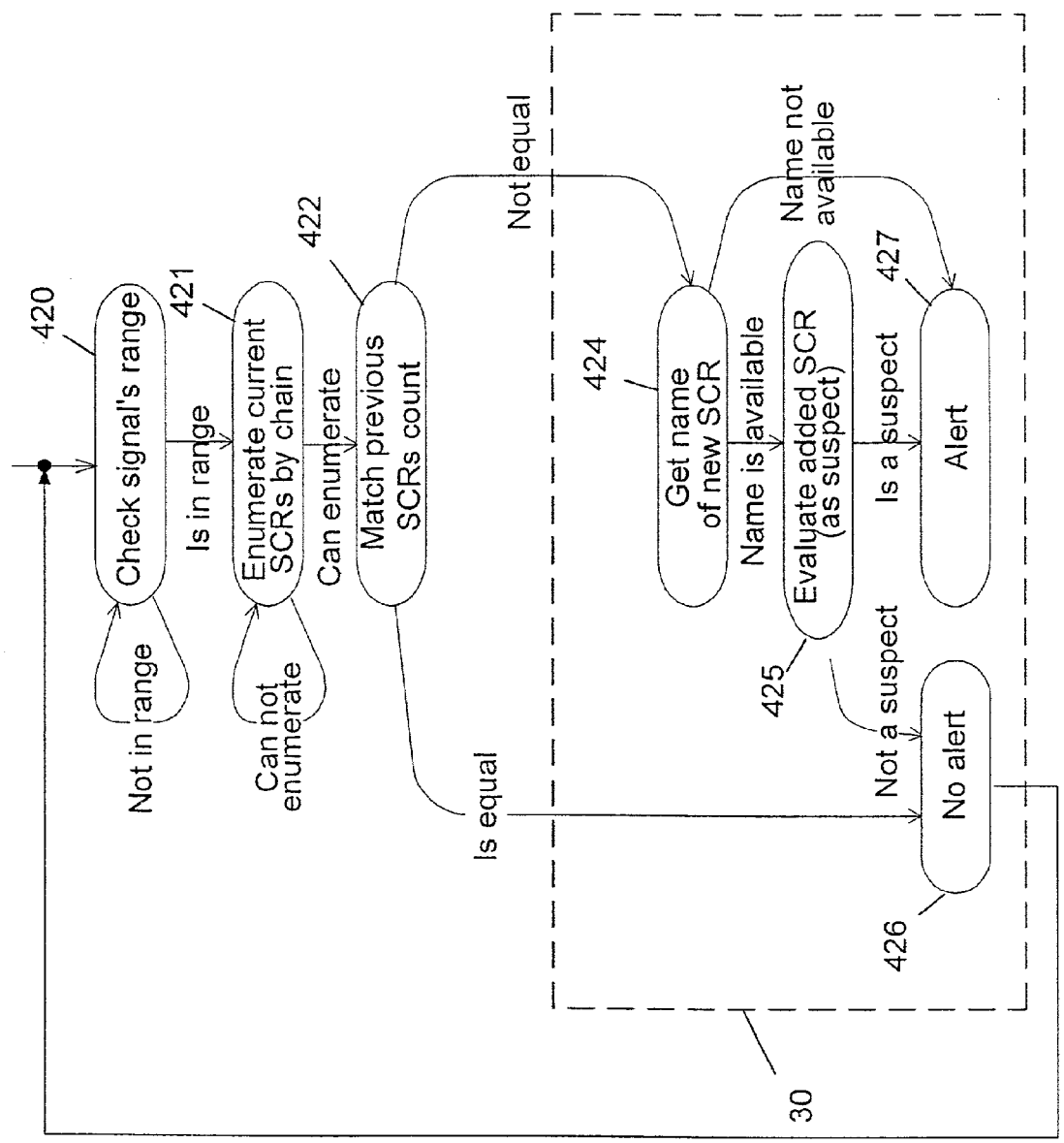
FIG. 4B is a flow diagram showing the evaluation on the chain level whether an SCR is added to an SCR chain.

In the Embodiment of FIG. 4B

In some cases, the Operating System enables an on-line identification of the occurrence of adding an SCR to a functional-stack chain during operation. The embodiment of FIG. 4B, is applicable for the case when the operating system enables obtaining a detailed list of SCRs in a given functional chain. The procedure therefore checks the available list, and if new, suspected SCRs are found within the list, an alert is issued. Initial checking of SCR chains by this embodiment, unlike initial checking of processes by the embodiment of FIG. 4A, should be done when the system is booting, and assumed to be free of breaches.

1. In step 420, the sensor checks whether enough parameters are available for carrying out the test.
2. In step 421, the procedure enumerates the SCRs within a specific chain, giving both the total number of SCRs and, preferably, also their order. If the enumeration is successfully obtained, the procedure continues to step 422.
3. In step 422, the procedure compares the obtained enumeration with the previously recorded SCR enumeration of same chain in knowledge base 150.
4. If a match of the enumeration is found in step 422, the procedure assumes that the addition of the SCR to the chain is legal, no alert is issued, and the operation returns to step 420, to check the next relevant occurrence of this type.
5. If the enumeration comparison of step 422 shows that the enumeration does not match, the procedure continues to step 424.
6. In step 424, the name of the SCR that has been found to be added to the chain is obtained. If, however, the name of the new SCR cannot be obtained for some reason, an alert is issued (in step 427).
7. In step 425, the SCR which has been found to be added to the chain is evaluated. The evaluation may include several tests, such as, the SCR function, its structure, etc. The evaluation of this stage may use data stored in knowledge base 150, in order to characterize the added SCR. Of course, if more than one SCR is found to be added, the procedure is carried out separately for each SCR. If the evaluation shows that the SCR is suspected, an alert is issued in step 427. Otherwise, the procedure continues to step 426, which does not issue an alert, and continues in supervising the shared code activity in step 420.

Figure 4C:
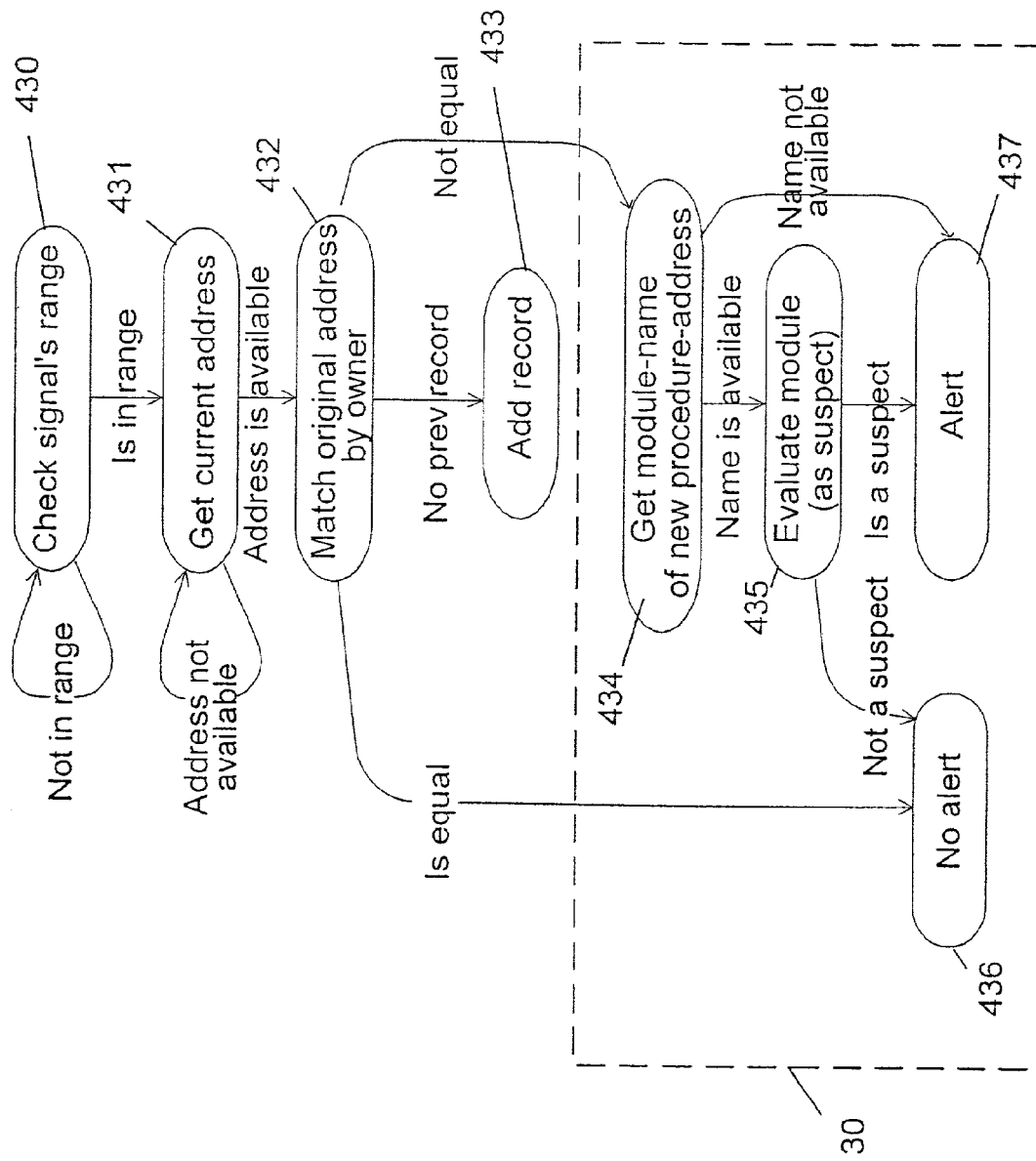
FIG. 4C shows handling the occurrence of a replacement of a procedure address in a given process which may indicate a previous unauthorized addition of an SCR to an SCR chain used by the process.

In the Embodiment of FIG. 4C

In some cases, the Operating System enables a change in the logic of a process by replacing the address of the procedure of one of its user mode components (e.g., a parent window, or one of its children). More particularly, one of the tasks of a modern Operating System is to manage multiple user-tasks through multiple windows. The following refers essentially to Windows™. The "user" part of the Operating System routes messages to and from different windows. Each window has its message loop waiting for incoming messages. Of course when the address pointing to the procedure that implements that loop in a given window is altered, the whole behavior or function of the window is altered without providing a proper notification to the user. This is one of the typical hostile activities that a sophisticated offender may wish to exercise after breaching the memory address space of a process by inserting a hostile SCR in one of the stacks connected to that process. The embodiment of FIG. 4C does not assume that the system may provide a notification on such a symptom, and it also assumes that the breach has already occurred, either without being notified or it was notified but at the time of the breach there was not enough evidence to cause an alert.

1. In step 430, the sensor checks whether enough parameters are available for carrying out the test.
2. In step 431, the procedure tries to obtain the current procedure-address for a given object. If the address is successfully obtained, the procedure continues to step 432.
3. In step 432, the procedure compares the obtained address with the previously recorded procedure-address of the same object in knowledge base 150.
4. If a match of the procedure-address is found in step 432, no alert is issued, and the operation returns to step 430, to check the next relevant occurrence of this type.
5. If no match is found in step 432 due to non-existence of procedure-address of the same object within knowledge base 150, and if there are no other signs in knowledge base 150 of a suspected breach, it is assumed that this is not a sign for a breach, and the obtained procedure-address is recorded within knowledge base 150 for a future use. In some other cases, however, this may be considered as a suspected sign, and the user is notified accordingly.
6. If the enumeration comparison of step 432 shows that the enumeration does not match, the procedure continues to step 434.
7. In step 434, the name of the SCR that contains the new procedure-address is obtained. If, however, the name of the SCR cannot be obtained for some reason, an alert is issued (in step 437).
8. In step 435, the SCR which has been found to be containing the new procedure-address is evaluated. The evaluation may include several tests, such as, the SCR function, its structure, etc. The evaluation of this stage may use data stored in knowledge base 150, in order to characterize that SCR. That SCR is at relatively high odds of being an added SCR that was not caught at the moment of addition. If the evaluation shows that the SCR is suspected, an alert is issued in step 437. Otherwise, the procedure continues to step 436, which does not issue an alert, and continues in supervising the shared code activity in step 430.

Figure 4D:
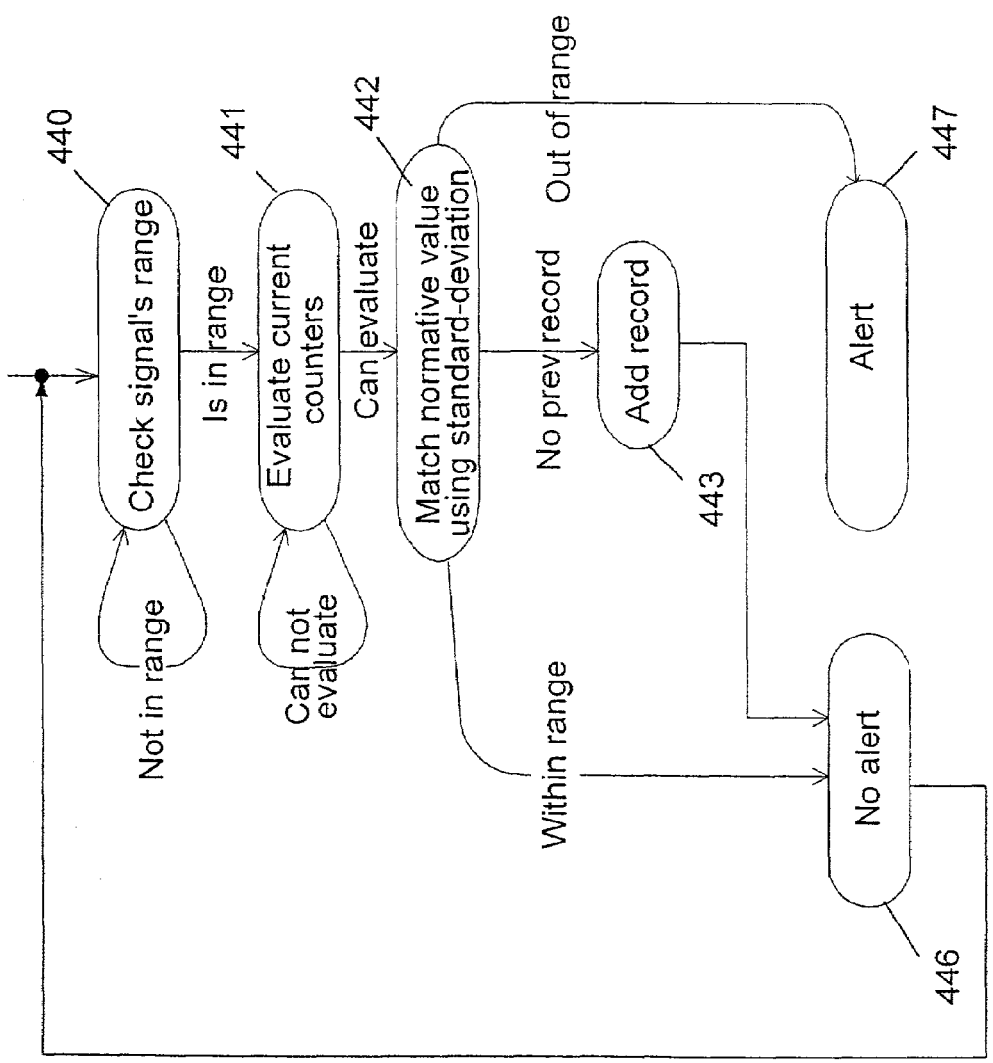
FIG. 4D shows a check of a degradation of execution performance or an indication of an unusual activity in a given process which may indicate a previous unauthorized addition of an SCR to an SCR chain used by the process.

In the Embodiment of FIG. 4D

This embodiment of the invention discloses a public sensor for passive direct approach offender with first setting and/or with second setting, according to the preferred embodiment of the invention:

Typically, when an SCR, such as the SCR that is being suspected as an offender, is engaged in either processor-intensive or IO-intensive activity and is not using a separate thread, the performance of the process is due to degrade. The public sensor looks for statistical evidence of both degradation in expected normal performance and increased abnormal activities of processes while they are executing.

The procedure of the embodiment of FIG. 4D shows the detection and evaluation of degrading performance or exceeding resource-consumption within a given task. The procedure checks the activity of the counters dealing with the stack operation. For example, the activity of the counters during the activation of a stack is characterized, and compared with statistical information previously accumulated and recorded in knowledge base 150 regarding the operation of same stack. If a deviation beyond a predefined threshold is found, an alert is issued.

1. In step 440, the sensor checks whether enough parameters are available for carrying out the test.
2. In step 441, the activity of the counters dealing with the activation of either the monitored SCR-chains or the specifically monitored processes is characterized. Some parameters that are checked are: their speed of operation, the manner of their incrementing, the load on the system's memory, on the processor(s), the disk activity, etc.
3. In step 442, the procedure compares the obtained characteristics with corresponding statistical characteristics previously accumulated, using a standard deviation. If a deviation above a predefined threshold value is found, the procedure continues to step 447. If, however, no record is found for comparison, the obtained information is recorded (step 443) in knowledge base 150, and the procedure continues to step 446, in which no alert is issued. If in step 442 the information is found to be within the predefined statistical threshold range, knowledge base 150 is statistically updated by the new data, and the procedure continues to step 446, in which no alert is issued. From step 446 the procedure returns to step 440, and the procedure initiates the test again for any new occurrence of the same type.

Figure 4E:
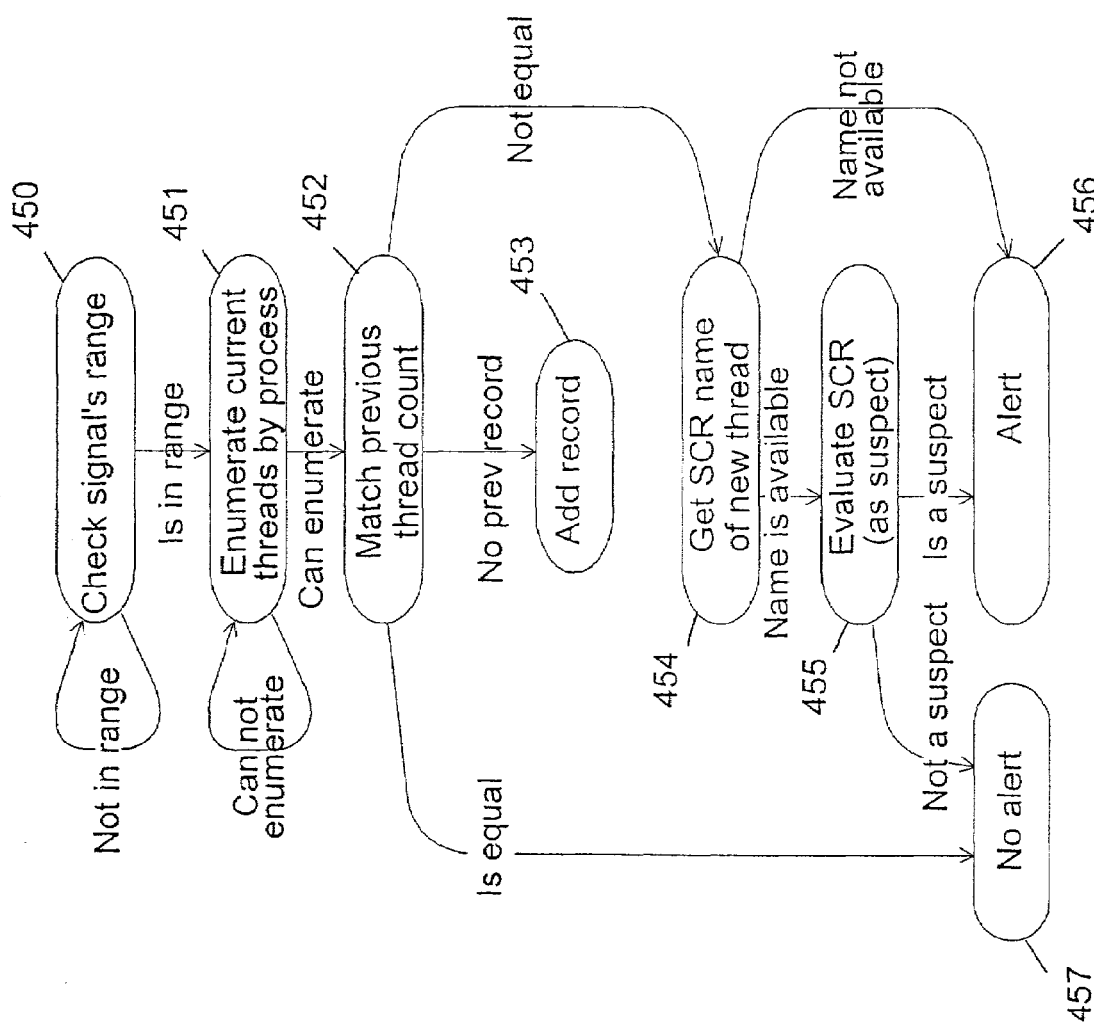
FIG. 4E is a flow diagram showing the evaluation of a change, wherein a new, unexpected thread is being created within some process's context. Where this is not an expected behavior of the process, this may indicate a previous unauthorized addition of an SCR to an SCR chain used by the process.

In the Embodiment of FIG. 4E

A suspect SCR may launch new threads to conceal its activity, because multithreading enables relatively smooth operation when compared to the sequential execution of extra code. The sensor looks for suspicious signs, like a new thread being created under a process context.

The procedure of FIG. 4E illustrates the detection and evaluation of a new thread created in the context of a given process. In some cases, when this is not a normal activity of the process, it may indicate an offender SCR trying to hide its extra activity by performing it on a separate thread. During the following activation of a process, the procedure of FIG. 4E compares the current threads with the threads as recorded, and alerts if it finds new ones. Getting the name of the SCR that stores the instructions that are run directly by the new thread, or the SCR that has issued the instruction of creating the new thread is not guaranteed: failing to get that name leads directly to an alert.

1. In step 450, the sensor checks whether enough parameters are available for carrying out the test.
2. In step 451, the sensor enumerates the threads as created by the present process.
3. In step 452, the procedure compares the obtained thread enumeration with the corresponding thread enumeration previously recorded in knowledge base 150 for that process. If a match is found, the procedure continues to step 457, in which no alert is issued. If no thread enumeration record is found for that specific process, the found thread enumeration is recorded (step 453). If, however, no matching is found, the procedure continues to step 454.
4. In step 454, the procedure tries to obtain the name of the SCR that stores the instructions that are run directly by the new thread, or the SCR that has issued the instruction of creating the new thread. If the procedure fails to get the new SCR name, an alert is issued (step 456). Otherwise, if the procedure obtains the name of the new SCR, the procedure continues to step 455.
5. In step 455, the procedure evaluates the newly found SCR. The evaluation involves checking the available information contained in the suspected module, for example, the list of legal SCRs that the current process expects to use, checksums, etc. If the procedure concludes that the new SCR is produced by a valid source, no alert is issued (step 457). If, however, the SCR is determined to be a suspected one, an alert is issued (step 456).

In the Embodiment of FIG. 5

In the embodiment of FIG. 5 the sensor performs more than one of the procedures as described in FIGS. 4A-4E. If a procedure of any of said tests detects with certainty an illegal action, an alert is issued. However, if non of said tests provides a result with certainty, a weight is given to each test result, and if the accumulated result of all the tests is found to be above a threshold value, an alert is issued.

1. In step 291, the sensor accumulates information from a plurality of tests. The tests of block 291 are dealing with the comparison of structure by verification of characteristics such as: the number of SCRs within the stack; the chain order of the SCRs within the stack; the time-stamps of the SCRs within the stack; the names of the SCRs within the stack; a signature of each SCR within the stack; the number of bits of each SCR within the stack; a checksum of each SCR within the stack; the physical path and name of each SCR within the stack. Some of these tests and few orthogonal tests are elaborated by the block diagrams of FIGS. 4A-4E, and their corresponding descriptions.
2. In step 292 a weight is given to each accumulated result, and a combined result is calculated. This is explained by FIG. 5.
3. In step 294 the combined result of all tests is compared with a preset threshold value, as registered in knowledge base 150.
4. If the combined result in step 294 is found to be above the threshold, an alert is issued.
5. If, however, the combined result in step 294 is found to be below the threshold, no alert is issued.

General Considerations

1. A private sensor may also cover almost all the cases that are covered by a public sensor. Public sensors better handle active offenders of the 'brain-transplanting' type (i.e., offenders that try to modify the behavior of a process). However, when implementing a private sensor, the special activities of the sensor's probe (which is an SCR) typically go into a separate thread, to minimize the extra load on the protected component.
2. Hybrid sensors, such as the sensor of FIG. 2B (a high-level component coupled with a 'guaranteed' bottom-level handler), are best for detecting silent manipulators, including those of the 'direct-approach' type, which do not communicate with their originating process.
3. Preferably, the sensor comprises an authorized 'learning' program which may be operated periodically to set and tune the threshold values by analyzing the sensor's performance. It may further tune the weights of inputs to the threshold function, change action parameters (e.g., to freeze an offender or not to freeze), and enhance the small heuristic knowledge base of the sensor (e.g., a digest of distinguished offenders).
4. A risk-assessor program would weigh current threats against available system resources and ask a load-balancing program to load or unload sensors (or other agents) as needed.

EXAMPLES

The following are some examples for possible implementations of some of the concepts that are described herein. The implementations should run on 32 bit Windows™ operated machines. More particularly, the two offender mechanisms that are described here can run on both Win9x and NT, while the defender mechanism can run as is on Win9x, and a slight modification enables it to run on NT as well.

The concepts and mechanisms described here may of course be adapted to other Operating Systems. Furthermore, even on the OSs referenced herein, namely Windows™, there are many SCR chains, beyond the Windows Message Hook mechanism, that may be exploited using the principles and concepts that are described herein above.

The description herein is not meant to be fully detailed or comprehensive: it is given here just for providing an intuitive understanding of the mechanism. Many details are omitted for the sake of brevity while keeping the essence clear.

Following are the descriptions of two offender mechanisms, a description of a defender for the second scenario; this defender mechanism may be adapted to the other first offender mechanism with a slight modification. Thereafter, some notes are provided, concerning reference material and technical details.

This appendix should be read and interpreted only within the context of the main text.

Offender, Mechanism #1
1. The offender launching program, LAUNCHER1.EXE, initializes its connection to the windows-hooks stack and does other common startup things.
2. LAUNCHER1.EXE looks for its victim, APP.EXE, by calling ::GetWindow. If found, it finds its thread ID by calling ::GetWindowThreadProcessId and passes it to CatchInnocentApp, a function that is supplied by HELPER.DLL.
3. Function CatchInnocentApp retrieves it's current thread ID by calling ::GetCurrentThreadId and stores it for global use, then it calls ::SetWindowsHookEx(WH_GET-MESSAGE, . . . ) on the victim's thread ID.
4. It then calls ::PostThreadMessage on that thread, passing it a WM_NULL or other nonsense message, just to activate the hook on APP.EXE.
5. The callback function GetMsgProc, supplied by HELPER1.DLL, waits for a WM_NULL (or equivalent) message. This function always returns with a call to ::CallNextHookEx.
6. When GetMsgProc receives the anticipated message, it calls SubclassInnocentApp which simply calls ::SetWindowLong ( . . . , GWL_WNDPROC, . . . ) on either the victim's window or one of its children, passing the address of NewVictimProc while storing the returned original procedure address for a later use.
7. The callback function NewVictimProc does whatever it wishes upon receiving the messages it wishes to divert. Other messages are passed to the original procedure with :: CallWindowProc.
8. Clean-up procedures are not covered here.

Offender, Mechanism #2
1. The offender launching program, LAUNCHER2.EXE, initializes its connection to the windows-hooks stack and does other common startup things.
2. LAUNCHER2.EXE calls CatchInnocentApp, a function that is supplied by HELPER2.DLL, passing it it's own current thread ID.
3. Function CatchInnocentApp calls ::SetWindowsHookEx (WH_KEYBOARD, . . . ) on all threads on this 'desktop' object (last argument is 0). On advanced versions of windows, calling ::SetWindowsHookEx (WH_KEYBOARD_LL, . . . ) can provide low-level keyboard input events.
4. The callback function KeyBoardProc supplied by HELPER2.DLL, waits for a keyboard message. It also checks to see that the current thread ID is not the thread ID of LAUNCHER2.EXE. This function always returns with a call to: CallNextHookEx.
5. When KeyBoardProc receives a keyboard message, it can do with it whatever it wishes. This would typically include processing the keyboard status and the thread current language setting to interpret the exact meaning of the key(s) pressed, then sending the information out to an unauthorized person.
6. Clean-up procedures are not covered here.

Defender for Offender Mechanism #2
1. The launching program, DEFENDER.EXE, initializes its connection with the windows-hooks stack and does other common startup things.
2. DEFENDER.EXE calls to CatchBadApp, a function which is supplied by ASSITANT.DLL, passing it its own current thread ID.
3. Function CatchBadApp calls ::SetWindowsHookEx (WH_DEBUG, . . . ) on all threads on this 'desktop' object (last argument is 0).
4. It then calls ::SetWindowsHookEx(WH_GETMESSAGE, . . . ) on all threads on this 'desktop' object (last argument is 0). There are now two hooks managed by ASSISTANT.DLL (the purpose of the second hook will be apparent thereafter).
5. The callback function DebugProc, supplied by ASSISTANT.DLL, waits for a keyboard hook notification, WH_KEYBOARD. This function always returns with a call to :CallNextHookEx.
6. When DebugdProc receives an anticipated notification (in this case, a keyboard), the OS also supplies it with a ::DEBUGHOOKINFO structure, so it can retrieve both the thread ID of the thread containing the filter function and the thread ID of the thread that installed the debugging hook. (Important note: this step was demonstrated on Win9x but not on NT. See the notes in a later section for more details).
7. Now DebugdProc calls ::PostThreadMessage on the installer thread ID, passing it a user-defined message, WM_DEFENDER. It also supplies the containing thread ID as LPARAM as a hint for the receiver.
8. GetMsgProc waits for a WH_MSG notification of message type WM_DEFENDER. When received, it calls ::GetModuleFileName to retrieve the bad application's name (and full path).
9. Now GetMsgProc can do whatever it wishes with the offending program, acting from within the thread of the offending program. The simplest act would be posing a message to the user, asking him if he wishes to close the program and letting him know the name and path of the suspected offender. If the user decides to close the suspect, GetMsgProc would simply call ::ExitThread for a graceful exit. Of course there are many other, more sophisticated acts that may be taken.
10. Clean-up procedures are not covered here.

Some Notes
1. A part of the mechanism that is described herein is covered in well known programming books and in other publicly available articles. These, however, are mainly concerned with the task of bringing a DLL into the address space of another process (or 'injecting' it)—not with the malicious acts that may follow, nor in the ways of detecting such acts—the later being the main concern of the present invention.
2. On Windows NT and its descendants (like Windows 2000), the system seems not to provide the offender thread ID with the DEBUGHOOKINFO structure. This behavior seems to be inconsistent with the current official on-line documentation that also seems to state that the DEBUGHOOKINFO structure is not implemented on Win9x, a statement that is apparently imprecise. Neglecting to handle these (apparently misdocumented) details will lead to a lame implementation of the defender under Windows NT and its descendants, while the previously described offender goes undisturbed.
3. The concepts are not dependent on the previously described specific OS-supplied API for detecting the presence of a new DLL or the invocation of some procedures; using such a mechanism is just a convenience that keeps this example simple. Many complementary tools and mechanisms exist, and more may be devised for fulfilling this task.
4. The importance of retrieving and storing different thread IDs is due to the fact that the mechanism which is described herein spreads concurrently upon different threads in different processes. An 'instance' of the DLL should therefore examine its own thread ID against thread IDs that come from other participants. Global storage for these IDs, as well as other inter-thread or inter-process variables, may be provided either by a shared section inside the DLL, or by some 'named' object such as a named memory mapped file.

The above examples and description have of course been provided only for the purpose of illustration, and are not intended to limit the invention in any way. As will be appreciated by the skilled person, the invention can be carried out in a great variety of ways, employing more than one technique from those described above, all without exceeding the scope of the invention.

The invention claimed is:

1. A security method for detecting malicious inter-process memory breaches in a computer using a multi-tasking operating system and having a memory divisible into memory spaces with the memory including a plurality of shared code resource (SCR) stacks, each stack including a plurality of SCRs that while being executed for carrying out the various demands of a plurality of program processes, during computer operation, are organized in specific chain-like structures with specific behaviors and with boundaries between memory spaces for said program processes but with a common physical memory space for a SCR stack, said computer, when carrying out a program process, having the capability of extending an SCR stack by at least one of adding and replacing at least one SCR to the organized chain-like structure of the SCR stack and modifying the SCR stack's behavior, said security method comprising the steps of:
   (a) creating and storing a knowledge base that is comprised of structure and/or behavior information of each SCR stack during its execution in the memory of the computer;
   (b) selecting for continuous monitoring an SCR stack which is being activated and executed by the computer operating system;
   (c) implanting a dedicated SCR within said selected and activated SCR stack;
   (d) monitoring said selected and activated SCR stack while it is being executed in memory via said dedicated SCR implanted in said selected and activated SCR stack to determine at least one of its structure and behavior;
   (e) generating a report by said dedicated SCR in said selected and activated SCR stack while said selected and activated SCR stack is activated and executing, said report being indicative of at least one of the structure and behavior of said selected and activated SCR stack;
   (f) transmitting said report for comparison with said stored knowledge base;
   (g) comparing the indications of said transmitted report with said knowledge base;
   (h) ceasing the activity and execution of said selected and activated SCR stack responsive to any non-matching detected between the indications of said report and said knowledge base to stop any hostile activity resulting in violation of the authenticity, structure and/or behavior of said SCR stack; and
   (i) issuing an alert indicative of the hostile activity responsive to ceasing the activity and execution of said selected and activated SCR stack according to step (h).

2. Method according to claim 1 wherein the knowledge base includes at least a list of all of the SCRs within the SCR stack, and the last date of their updating.

3. Method according to claim 1 wherein step (g) comprises using a computer software code to compare SCR stack structure with the expected structure, the comparison comprising at least one of verifying one of the number of SCRs within the activated SCR stack, verifying the chain order of the SCRs within the SCR stack, verifying the time-stamps of the SCRs within the activated SCR stack, verifying the names of the SCRs within the activated SCR stack, verifying a signature of each SCR within the activated SCR stack, verifying the number of bits of each SCR within the activated SCR stack, verifying a checksum of each SCR within the activated SCR stack, verifying the physical path and name of each SCR within the activated SCR stack, verifying the duration of performance of the SCR stack, and verifying the duration of performance of each SCR within the SCR stack.

4. Method according to claim 1 wherein step (g) comprises using a computer software code to compare SCR stack behavior with the expected behavior, the comparison comprising at least one of verifying the I/O devices to which a communication is made when the stack is activated by a specific process, and verifying the I/O addresses to which a communication is made when the stack is activated by a specific process.

5. Method according to claim 1 wherein at least one of the SCRs in the activated SCR stack is a Dynamic Link Library (DLL).

6. Method according to claim 1, including the step of providing software code for controlling the dedicated SCR, wherein said code is a self learning code, which is based on self learned rules.

7. A security apparatus for detecting malicious inter-process memory breaches in a computer using a multi-tasking operating system and having a memory divisible into memory spaces with the memory including a plurality of shared code resource (SCR) stacks, each stack including a plurality of SCRs that while being executed for carrying out the various demands of a plurality of program processes, during computer operation, are organized in specific chain-like structures with specific behaviors and with boundaries between memory spaces for said program processes but with a common physical memory space for a SCR stack, said computer, when carrying out a program process, having the capability of extending an SCR stack by at least one of adding and replacing at least one SCR to the organized chain-like structure of the SCR stack and modifying the SCR stack's behavior, said security apparatus comprising:
   (a) a knowledge base that is comprised of structure and/or behavior information of each SCR stack during its execution in the memory of the computer;
   (b) a probe in a form of an SCR that is implanted within a selected and activated SCR stack for monitoring said selected and activated SCR stack while the stack is being executed in memory and for generating a report indicative of at least one of the structure and behavior of said selected and activated SCR stack;
   (c) a sensor for receiving said report and for comparing indications relating to at least one of the structure and behavior of said selected and activated SCR stack with said stored knowledge base;
   (d) means for ceasing the activity and execution of said selected and activated SCR stack responsive to any non-matching detected between the indications of said report and said knowledge base to stop any hostile activity resulting in violation of the authenticity, structure and/or behavior of said SCR stack; and
   (e) means for issuing an alert indicative of the hostile activity responsive to ceasing the activity and execution of said selected and activated SCR stack.

8. Apparatus according to claim 7, which comprises a separate probe implanted within each selected SCR stack, and a common sensor receiving the report from one or more of the said implanted probes.

9. Apparatus according to claim 7 wherein the knowledge base includes at least a list of all of the SCRs within the SCR stack, and the last date of their updating.

10. Apparatus according to claim 7 including means for executing computer software code to compare an SCR stack structure with the expected structure stored in the knowledge base for a particular SCR stack.

11. Apparatus according to claim 7 including means for executing a computer software code to compare SCR stack behavior with the expected behavior stored in the knowledge base for a particular SCR stack.

12. Apparatus according to claim 7 wherein at least one of the SCRs is a Dynamic Link Library (DLL).

13. Apparatus according to claim 7, wherein said sensor includes software code that is a self learning code, which is based on self learned rules.

* * * * *